Sept. 1, 1964   R. L. CROWTHER   3,147,191
NUCLEAR REACTOR FUEL
Filed Jan. 25, 1961   5 Sheets-Sheet 3

INVENTOR.
RUSSELL L. CROWTHER,
BY
ATTORNEY.

Fig. 17a

RUSSELL L. CROWTHER
INVENTOR.

United States Patent Office 3,147,191
Patented Sept. 1, 1964

3,147,191
NUCLEAR REACTOR FUEL
Russell L. Crowther, Saratoga, Calif., assignor to General Electric Company, a corporation of New York
Filed Jan. 25, 1961, Ser. No. 84,786
23 Claims. (Cl. 176—68)

This invention relates to the conversion of mass to energy in a nuclear chain fission reactor, and it more specifically relates to a new and improved neutron moderated nuclear power reactor and fuel element assembly for such a reactor in which nuclear energy is released at substantially increased power densities.

The release of large amounts of energy through nuclear fission reactions is now quite well known. In general, a fissionable atom, such as $U^{233}$, $U^{235}$, $Pu^{239}$, or $Pu^{241}$, absorbs a thermal or epithermal neutron in its nucleus and undergoes a nuclear disintegration or fission. This produces on the average, two fission products of lower atomic weight and great kinetic energy, and usually two or three fission neutrons also of high energy. For example, the thermal neutron fission of a $U^{235}$ atom produces a light fission product and a heavy fission product with mass numbers ranging between 80 and 110 and between 125 and 155 respectively, and an average of 2.5 neutrons. The energy release approaches about 200 mev. (million electron volts) per fission. Others atoms such as $U^{238}$ and $Th^{232}$ are fissionable upon nuclear absorption of epithermal or fast neutrons.

The kinetic energy of the fission products is quickly dissipated as heat in the fuel material. If during this fission process there is on the average one net neutron remaining which induces a subsequent fission event, the fission reaction becomes a chain reaction which is self-sustaining and the heat generation is continuous. The heat is removed by passing a coolant fluid through heat exchange relationship with the fuel and a load or heat sink. The reaction may be continued as long as sufficient fissionable material remains in the system to override the effects of the fission products which will be produced during operation.

Useful mechanical or electrical energy can be generated in a nuclear reactor power plant through conversion of the thermal energy released in the foregoing neutron-induced nuclear fission reactions. This energy release involves a chain reacting structure or reactor core containing nuclear fuel elements, a neutron moderator which is usually present in the core to thermalize the fission neutrons and increase the probability of subsequent fission capture of these neutrons in the fuel, means for passing a reactor coolant through heat exchange relationship with the fuel elements, and means for the control of the coolant flow and the core operating conditions to produce directly or indirectly a heated working coolant. In some cases the neutron moderator and the reactor coolant are combined in a single fluid such as light water (natural isotopic mixture of $H_2O$ and $D_2O$) or heavy water (essentially pure $D_2O$), and hydrocarbonaceous organic liquids such as diphenyl, the isomeric terphenyls, naphthalene, anthracene, phenanthrene, and the like. The working fluid referred to previously may be different from or the same as the reactor coolant passed through the chain reacting structure. In any event, the working fluid is supplied to a suitable prime mover in order to generate the mechanical or electrical energy.

Nuclear power reactors of many kinds are extensively described in the literature. For example, volume 3 entitled "Power Reactors" of the Proceedings of the International Conference on the Peaceful Uses of Atomic Energy (1955) and volumes 8 and 9 entitled "Nuclear Power Plants" of the Proceedings of the Second United Nations International Conference on the Peaceful Uses of Atomic Energy (1958) described a number of different power reactor types.

High nuclear reactor power plant efficiencies are favored by the operation of the reactor core at the highest possible power density, that is, operation so that the reactor core generates and releases thermal energy to the reactor coolant at the highest feasible and uniform rate in all incremental portions of the core. These rates are customarily expressed in terms of kilowatts per liter of reactor core volume. There are, however, practical limits on the power density which can be maintained. These limits are essentially two; namely, fuel and reactor structural material temperature limits, and coolant fluid temperature and pressure limits. Operation of the reactor core so as to exceed any of these limits in any region may result in melting of the fuel with resultant fission product release, fuel clad burnout with possible failure of the clad and chemical reaction of the clad or the fuel with the coolant or other material present, or coolant decomposition which may result in the foregoing effects. None of these limits is reached simultaneously at all points throughout the entire reactor core. For example, the output of a reactor core as a whole can be limited at an undesirably low value due to the occurrence of melting at the centerline of a single fuel element in one particular part of the core while all other fuel elements operate with centerline temperatures far below the melting point. Neutron flux values are not uniform through the core, but rather vary approximately as a cosine function longitudinally through it and as a Bessel function across it. With uniform concentrations of fissionable material in the fuel, power levels and fuel temperatures are higher in the center of the core than near its various peripheral surfaces. Even transversely across a small increment of the core such as in a given fuel assembly, the fuel elements at the periphery of the assembly may generate anomalously great quantities of heat and run substantially hotter than fuel elements within the assembly. This may be due to the higher population of thermal neutrons which builds up in a "slab" or layer of neutron moderator adjacent the assembly, or in the space between immediately adjacent fuel assemblies. Depending on the properties of the fuel and the moderator, the power level and central temperatures in peripheral fuel elements adjacent such moderator slabs may be as much as 2.5 times greater than the average power level in the particular fuel assembly.

In the past, elaborate attempts have been made to overcome these problems. However, little success has been achieved in developing a mechanical design of a reactor core in which the heterogeneous fuel and control poison elements could be distributed throughout the moderator without the existence of moderator slabs or other inhomogeneities in moderator-to-fuel ratio.

One such prior attempt involved a liquid moderated and cooled reactor in which the liquid moderator slabs between adjacent assemblies are partly displaced in strips of a material having a low neutron capture cross section such as zirconium, and the control poison elements operating between the assemblies are provided with followers of such material. However, this does not fully overcome the problem. The required clearances between the fuel assemblies and the control elements provide space for a liquid moderator slab in which flux peaking occurs. There is a substantial increase in the amount of extraneous material in the core in which parasitic neutron absorption occurs. The followers must be maintained and replaced in case of wear or corrosion. The required reactor vessel height is increased by one core height due to the presence of the followers. If the followers enter the top of the core, reactor refueling is made more difficult since it must be accomplished between the followers extending upward out of the core.

Another prior attempt involved the reduction of the enrichment (the concentration of a thermal neutron fissionable material such as $U^{235}$ present in a fertile material such as $U^{238}$) in the otherwise hottest fuel elements relative to the enrichment of remaining elements in the assembly. Since fuel operating temperature is directly proportional to power level, and this in turn is directly proportional to the product of thermal neutron flux and the enrichment, it was thought that an enrichment reduction corresponding to the degree of flux peaking at the hottest rod would solve the problem. However, the reduction in fuel enrichment causes a decrease in neutron absorption which results in a corresponding neutron flux increase in the region of the enrichment decrease and an attendent reduction in the gains from enrichment reduction. Also, reduction of enrichment in slightly enriched fuel elements, which contain considerable fertile material, results in an increase in the conversion of the fertile material to new fissionable material due to the reduced neutron absorption competition of the original fertile material with the fissionable material. Subsequently, the increased production of fissionable material in the elements of reduced enrichment produces sufficient new fissionable material that any initial gains from reduced enrichment are reduced considerably or cancelled as the elements are irradiated in a reactor. The large thermal neutron fission cross section of $Pu^{239}$ which is produced from neutron capture in the fertile component of uranium, $U^{238}$, also contributes considerably to the time dependent cancellation of the gains from simple enrichment variation in uranium.

Another prior attempt to solve the problem involved the removal of some central fuel elements in each fuel assembly to provide an open passage into which additional moderator is introduced. This induces a deliberate flux peak in the central region of the fuel assembly similar to the one existing in the surrounding slab or slabs. Although this effectively reduces the relative peak-to-average flux ratio in the fuel elements between these bodies of moderator, a number of serious disadvantages result. In the case of a liquid moderator coolant, coolant by-passing through the central passage results unless a tubular flow channel is added here to prevent it. Such a channel increases the amount of extraneous structural material and parasitic absorption of neutrons in the core. Reactivity is lowered due to neutron absorption in the moderator in the central passage. Although a lower fuel inventory may be possible, a decreased fuel heat transfer area results. In order to maintain the same moderator-to-fuel ratio in such an assembly, the fuel element spacing must be decreased making the lattice tighter and this in turn substantially increases mechanical complexity in respect to the fuel element spacers and supports. It also decreases the cross sectional area open to flow of coolant in contact with the fuel.

Another significant problem involved in nuclear power reactor and fuel design and operation is that concerning the length of time during which full rated power levels can be maintained. Long operation periods require high quantities of fissionable material in the fuel. This is customarily incorporated in the new fuel and it produces a high initial reactivity in the core which must be balanced by the negative reactivity worth of the control poison elements, and this can complicate the reactor control.

The present invention successfully overcomes the aforementioned problems for the first time and provides an improved gaseous or liquid fluid cooled thermal neutron energy spectrum nuclear fission reactor core and an improved fuel assembly therefor which provides reduced flux and power peaking, reduced mechanical complexity, increases in power and power densities on the order of about 50%, and substantially extended fuel life and energy output.

It is therefore an object of this invention to provide a nuclear reactor having very substantially increased power output and power density capabilities.

It is another object of this invention to provide a nuclear reactor core in which the relative peak-to-average flux and power levels have been substantially reduced without resort to complex of inefficiently used core structure.

Another object is to provide an improved nuclear reactor fuel assembly in which each fuel element operates at more nearly equal power levels regardless of the relative position of the element in the assembly.

Another object of this invention is to provide a nuclear reactor fuel element which has improved conversion of fertile to fissionable material.

Another object of this invention is to provide a nuclear reactor fuel element which requires less initial control capacity or excess multiplication to achieve a desired fuel lifetime or exposure.

Other objects and advantages of the present invention will become apparent to those skilled in the art as the description and illustration thereof proceed.

Briefly one aspect of this invention is a device which comprises a first fuel material initially containing $U^{238}$ and a thermal neutron fissionable material, and which upon irradiation by neutrons of thermal energy spectrum is subject to a non-uniform thermal neutron flux distribution including local regions of relatively high thermal neutron flux to which a portion of said device is exposed, including the improvement which comprises a second fuel material disposed in said device in said local region of relatively high thermal neutron flux, said second fuel material initially containing $Th^{232}$ and a thermal neutron fissionable material, and having a value of $\Sigma_a$ initially no less than that of said first fuel material.

Another aspect of this invention is a nuclear fuel element adapted for use in assemblies of such elements with a neutron moderator in a heterogeneous structure capable of a self-sustained thermal neutron induced chain nuclear fission reaction and in which assembly structural inhomogeneities in moderator-to-fuel ratio produce a non-uniform thermal neutron flux distribution including local regions of relatively high thermal neutron flux to which a portion of said fuel element is exposed, which fuel element comprises at least one fuel element segment, a body of nuclear fuel contained in said segment, said body comprising a first fuel material and a second fuel material, said first fuel material initially containing $U^{238}$ and a thermal neutron fissionable material, said second fuel material initially containing $Th^{232}$ and a thermal neutron fissionable material, the amounts of $Th^{232}$ and fissionable material in said second fuel material being sufficient to provide value of $\Sigma_a$ for said material initially no less than the value of $\Sigma_a$ for said first fuel material, at least the major portion of said second fuel material being disposed in said segment in at least one local region of relatively high thermal neutron flux.

An additional aspect of this invention is a nuclear fuel element assembly adapted for use with other assemblies of such elements and with a neutron moderator in a heterogeneous structure capable of a self-sustained thermal neutron induced chain nuclear fission reaction and in which assembly structural inhomogeneities in moderator-to-fuel ratio produce a non-uniform thermal neutron flux distribution including local regions of relatively high thermal neutron flux to which minor portions of said fuel assembly are exposed, which fuel assembly comprises a plurality of elongated nuclear fuel elements spaced apart from one another in fixed spatial relation, at least one nuclear fuel body contained in each of said elements, said nuclear fuel body comprising at least one of a first fuel material and a second fuel material, said first fuel material initially containing $U^{238}$ and a thermal neutron fissionable material, said second fuel material initially containing Th$^{232}$ and a thermal neutron fissionable material, the amounts of Th$^{232}$ and fissionable material in said second fuel material being sufficient to provide a value of $\Sigma_a$ for said material initially no less than the value of $\Sigma_a$ for said first fuel material, at least the major portion of said second fuel material being disposed in the elements of said assembly in the local regions of relatively high thermal neutron flux, and at least the major portion of said first fuel material being disposed in the fuel elements of said assembly other than in said local regions.

Another aspect of this invention comprises an improved nuclear reactor core containing a plurality of these improved nuclear reactor fuel elements or assemblies disposed parallel to and spaced apart from one another, a neutron moderator disposed in said reactor core with said fuel assemblies, the quantities of fissionable material and neutron moderator in said reactor being sufficient to produce a self-sustaining nuclear chain fission reaction therein.

The present invention will be more readily understood by reference to the following detailed description and illustration thereof including the accompanying drawings, in which.

Figures 1, 2, 3:
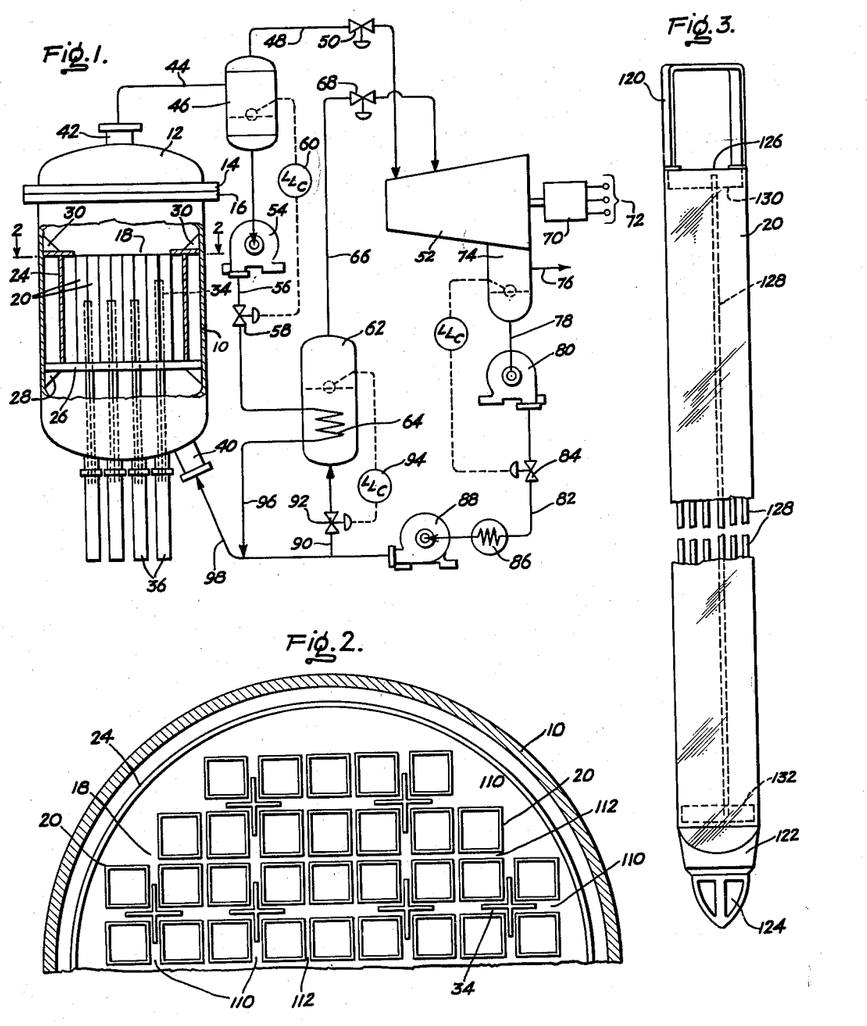
FIGURE 1 is an elevation view in partial cross section of a nuclear reactor cooled and moderated by boiling water, the figure also including a schematic flow diagram of a power reactor system adapted to produce electrical energy from the thermal output of the reactor.
FIGURE 2 is a partial transverse cross section view of the reactor illustrated in FIGURE 1 showing the arrangement of fuel assemblies and control elements in the reactor core.
FIGURE 3 is an elevation view in partial cross section of a rod type nuclear fuel assembly contained within a flow channel and suitable for use in the reactor shown in FIGURES 1 and 2.

The description of FIGURE 1 is conducted in terms of a specific example of a nuclear reactor power plant system in which the present invention may be used, and it serves to illustrate the structure and operation of such systems and to illustrate the problems which are overcome by incorporation of this invention. Comparative examples showing the advantages in incorporating the present invention in such systems are given below as Examples 1 through 7.

The system of FIGURE 1 includes a reactor pressure vessel 10 provided with removable head 12 secured by means of flanges 14 and 16. In a typical case, this vessel is 39.5 feet inside height, 12.2 feet inside diameter, has a wall thickness of 5.6 inches, and is lined with stainless steel. Disposed within vessel 10 is a nuclear chain reacting core 18 made up of a plurality of nuclear fuel element assemblies. Each assembly consists of an open-ended tubular flow channel 20 surrounding an assembly of rod type nuclear fuel elements. The flow channel is separably secured to the fuel elements assembly, and the assembly and the channel are removable as a unit from the reactor core. A neutron moderating coolant liquid flows upwardly through each channel. Reactor core 18 is immediately surrounded by a thermal shield 24. The thermal shield 24 and the reactor core 18 are all supported upon a lower core support structure or grid 26 which in turn is supported by means of support elements 28 from the internal surfaces of vessel 10. Upper support means 30 are provided which secure the upper portion of the thermal shield structure within the vessel, and give lateral support to the core 18. A typical core consists of 452 fuel assemblies arranged in a group approximating a right circular cylinder. These fuel assemblies are described in detail below in connection with FIGURE 3 and Example 1. The core also includes control poison elements 34 which are reciprocable by means of an equal number of control element drive mechanisms 36, and by means of which the thermal energy release rate or power level of the core is controlled. The control elements 34 are withdrawn from the core to increase reactivity and raise the power level of the core, and are inserted to decrease reactivity and to lower the power level. Only three control elements 34 and control drive mechanisms 36 are shown in FIGURE 1 for simplicity of illustration. Although the control rod drives are shown mounted below the pressure vessel 10 and extend upwardly into the core, top mounted drives on vessel head 12 extending downwardly into the core may be substituted.

Demineralized light water constitutes the reactor coolant and the neutron moderator employed in this nuclear reactor. It is introduced into the bottom of vessel 10 by means of inlet 40 at a temperature of 505° F., about 40° F. below the saturation temperature which is about 545° F. at the operating pressure of 1000 p.s.i.a. The water flows upwardly through lower support structure 26 and through all of the 452 flow channels 20 in direct heat exchange relationship with the fuel element assemblies contained in the channels. The water is heated to the boiling point and partially vaporized. A mixture of boiling water and steam is discharged into the region above core 18 and flows from reactor vessel 10 through outlet 42. This mixture is passed by means of line 44 into separator drum 46. Here the boiling water is separated from the steam, the steam being introduced through line 48 at a rate controlled by valve 50 into the high pressure inlet of dual admission steam turbine 52. The unvaporized water separated in steam drum 46 is pumped by means of pump 54 through line 56 at a rate controlled by valve 58 and liquid level controller 60 into secondary steam generator 62. This water, at its boiling temperature of about 545° F., is passed through heat exchange coil 64 where it is cooled. Additional steam is produced on the outside of coil 64 at pressures ranging from about 500 and 1000 p.s.i.a. depending upon system load. This additional or secondary steam is introduced by means of line 66 at a rate controlled by valve 68 into the secondary steam admission port of turbine 52. The turbine drives an electrical generator 70 to a gross electrical output of 192 mwe. (electrical megawatts). The generator is connected through the usual transformer to a transmission line, or to any other load, by means of output terminals 72.

Exhaust steam from turbine 52 is condensed in condenser 74 from which non-condensible gases are removed through line 76 by means of an exhaust system not shown. The condensate is removed through line 78 by means of condensate pump 80. The condensate is passed through line 82 at a rate controlled by valve 84 and becomes feedwater in the power plant system. The feedwater, which may be preheated in exchanger 86 by means of extraction steam from the turbine or other source of heat, is pumped back to the evaporation facilities by means of feedwater pump 88.

One portion of the feedwater, termed secondary feedwater, is passed through line 90 at a rate controlled by valve 92 and liquid level controller 94 into the secondary steam generator 62 for re-evaporation. The remaining feedwater portion is combined with the subcooled water discharged from the secondary steam generator coil 64 through line 96, the mixture being introduced as primary feedwater through line 98 and primary feedwater inlets 40 into the reactor vessel 10.

The performance of such a nuclear reactor power plant system with prior art and improved fuel is illustrated below in Examples 2 and 4–7.

In FIGURE 2 is a partial transverse cross section view of reactor vessel 10 taken through the core at the level 2—2 shown in FIGURE 1. Reactor vessel 10 is shown surrounding core 18 and thermal shield 24. The core 18 is a structure consisting of the plurality of square flow channels 20 disposed parallel to and spaced apart from one another. The fuel rod assemblies are not shown here for simplicity of illustration. The flow channels are grouped together in groups of four with relatively narrow spaces 112 between them to permit easy fuel assembly insertion and removal. Considerably wider spaces 110 exist between this group and the various adjacent groups of four flow channels 20 and within which cruciform control elements 34 are disposed. Thus each group of four fuel-containing flow channels is surrounded by four control elements 34. Spaces 110 and 112 between the flow channels contain water and form the liquid moderator slabs within which thermal neutron flux peaking can occur.

Referring now to FIGURE 3, a foreshortened longitudinal view in partial cross section of a fuel element assembly referred to in the description of FIGURES 1 and 2 is shown. This particular fuel assembly consists of a tubular flow channel 20 of square cross section provided at its upper end with a lifting bail 120 and at its lower end with a nose or support piece 122. Support piece 122 is provided with coolant flow openings 124 and the upper end of flow channel 20 is open at 126 to permit coolant flow through channel 20. Contained within the flow channel in this assembly is a square array of fuel elements or rods 128 extending between upper and lower tie plates 130 and 132. For simplicity of illustration, only a single rod 128 is shown extending the full length of the fuel assembly between the tie plates, although it should be understood that all the fuel elements are so disposed. Intermediate fuel element spacing devices not shown are disposed along the length of the fuel assembly within channel 20 to maintain the fixed spacing of the fuel elements throughout their entire length.

Figure 4:
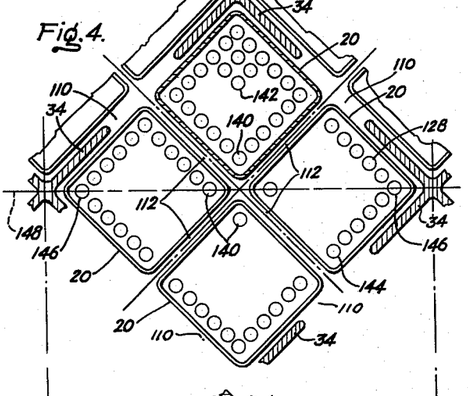
FIGURE 4 is a transverse cross section view of an adjacent group of four prior art fuel assemblies having fuel rods arranged in a square pitch and illustrating the presence of moderator slabs between the assemblies and between adjacent groups of fuel assemblies.

In FIGURE 4 a transverse cross section view is shown of a group of four adjacent flow channels 20 each containing a 6 by 6 array or assembly of fuel elements, this group being disposed between four cruciform control elements 34 as previously described in FIGURE 2. The fuel material is uranium of relatively low enrichment. Relatively thin slabs of light water moderator are present in the spaces 112 between the adjacent flow channels 20. However, relatively thick slabs of water moderator are present in the spaces 110 in which the cruciform control elements 34 are disposed.

In any thermal neutron fission reactor having unfueled gaps filled with a slab of moderator, the ratio of neutron moderation or thermalization to thermal neutron absorption in these gaps is much greater than the corresponding ratio in or near the individual fuel elements. The thermal neutron population present in a fuel rod is relatively low due to its high thermal neutron absorption. The thermal neutron population present between the fuel elements and particularly in the moderator slabs of various sizes between the fuel assemblies is relatively high due to the substantial absence of thermal neutron absorption in these regions. Thermal neutrons therefore tend to accumulate or "peak" in the moderator slabs and create local regions of relatively high thermal neutron flux. This flux peak extends at least into the region occupied by the peripheral fuel elements of the adjacent fuel assemblies. The thermal neutron flux levels and therefore the power levels in these peripheral fuel elements are thus substantially higher than the average flux and power levels of all the fuel rods throughout the assembly. Other structural inhomogeneities in the effective moderator-to-fuel ratio, including the effect of the transverse moderator slab existing at various levels in an assembly of segmented fuel rods, cause similar flux and power peaking.

The flux and power peaking effects are particularly critical near the corner of a fuel assembly where one or more fuel elements exist adjacent the intersection of a pair of such moderator slabs, and especially if such corner elements are segmented creating an intersection of three such slabs. These corner elements tend therefore to be the hottest elements in the fuel assembly. They are usually the elements whose operating temperatures limit the power output of the whole fuel assembly, and possibly of the whole reactor core.

For these reasons, the fuel elements shown in the fuel assemblies of FIGURE 4 operate at widely different power levels and temperatures. The innermost corner elements 140 tend to run somewhat hotter than the average of all of the elements and hotter than an individual element 142 located in the interior of the assembly. Fuel element 140 stands at the intersection of two relatively thin moderator slabs 112. Other corner elements such as element 144 stand at the intersection of a relatively thick moderator slab 110 and a relatively thin slab 112 and therefore runs somewhat hotter than the innermost corner elements 140. The outermost corner fuel elements are those such as 146 which stand at the intersection of two relatively wide moderator slabs 110. These elements are the hottest of all when the adjacent control elements 34 are withdrawn. The thermal neutron population is very high in and near this moderator slab and accordingly the power level of these adjacent corner elements 144 is substantially higher than any other fuel element in the assembly.

Figure 5:
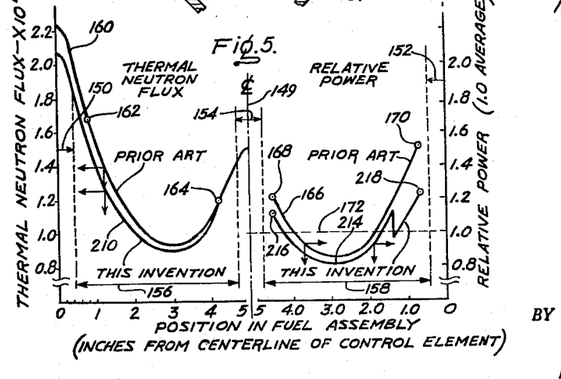
FIGURE 5 is a vertically divided graph showing a comparison in the variation in thermal neutron flux and power levels along the diagonals through groups of four prior art fuel assemblies shown in FIGURE 4 and through a group of fuel assemblies embodying this invention shown in FIGURE 7.
Figure 7:
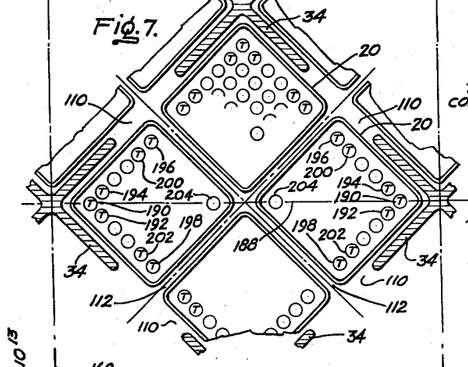
FIGURE 7 is a transverse cross section view of an adjacent group of four fuel assemblies embodying the present invention, the thorium compensation fuel rods being denoted by an encircled T.

Referring to FIGURE 5, this graph is aligned vertically with respect to FIGURES 4 and 7 and is arranged to show the variations in relative thermal neutron flux and relative power with distance along diagonals 148 and 188 through the groups of four adjacent prior art and improved fuel assemblies shown in FIGURES 4 and 7, respectively. Relative power is the ratio of the power level averaged over the length of the given element to the average of such levels for all the fuel elements in the group considered. The curves shown are symmetrical about the vertical centerline 149 which corresponds to the point of intersection of the two narrow moderator slabs 112 of FIGURES 4 and 7. Only one-half of the flux and power curves are shown and these are separated on opposite sides of centerline 149, it being understood that the other half of each curve is a mirror image of the half shown. Thermal neutron flux variations are shown on the left hand portion and power level variations are shown on the right hand portion of FIGURE 5. The graph is also divided by vertical lines into five horizontally spaced regions corresponding to five regions in the group of fuel assemblies shown in FIGURES 4 and 7 along diagonals 148 and 188 respectively. Regions 150 and 152 correspond to the intersections of the large moderator slabs 112 shown in FIGURES 4 and 7, that is the regions from which control elements 34 are withdrawn. Region 154 represents the region at which the smaller moderator slabs 112 intersect adjacent the inner corner elements. Regions 156 and 158 correspond to the regions occupied by the fuel elements along diagonals 148 and 188 between the inner corner elements and the outer corner elements.

Curve 160 in the left hand part of FIGURE 4 shows the smoothed variation in thermal neutron flux through these various regions along the diagonal 148 through one fuel assembly. The thermal neutron flux is relatively high in region 150 (and 152) corresponding to the regions containing the large moderator slabs. The thermal neutron flux also is relatively high in the central region 154 corresponding to the intersection of the small moderator slabs. The thermal neutron flux is relatively low throughout region 156 (and 158) owing to the high thermal neutron absorption by the individual fuel elements located in this region. The detailed distribution of neutron flux within each fuel element and within the water gaps between the fuel elements is not shown. Curve 160 thus clearly shows the substantially higher than average thermal neutron flux values which exist at points 162 and 164 which are the positions corresponding to the outer and inner corner rods 146 and 140 respectively.

Curve 166 in the right hand part of FIGURES 5 shows the smoothed variation in relative power level for the six fuel elements located along the diagonal 148 of one fuel assembly. No substantial amount of power is generated in the moderator slabs and accordingly curve 166 ends near points 168 and 170 which represent the edge locations of inner and outer smoothed corner elements 140 and 146 respectively. Horizontal line 172 represents the average power level for all six elements along the diagonal. Curve 166 clearly shows that the relative power levels for the inner and outer corner elements are about 22% and about 51% higher than the average power.

Figure 6:
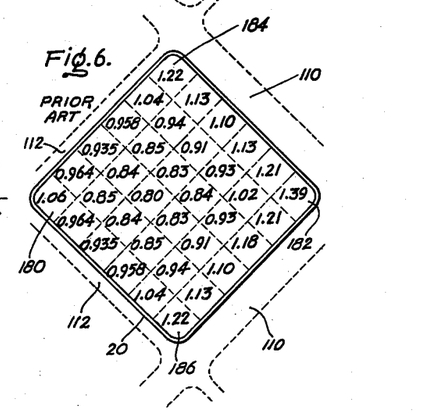
FIGURE 6 is a contour map showing the spatial variation in the relative power levels existing in each fuel rod of the right hand fuel assembly shown in FIGURE 4.

Referring now to FIGURE 6 a contour plot is shown of the relative power level values for each individual fuel element in a fuel assembly corresponding to the right hand fuel assembly indicated in FIGURE 4. This relative power level is the ratio of the average level over the length of a given element to the average level for all elements in the assembly. The fuel region enclosed by flow channel 20 in FIGURE 6 is divided by broken lines into 36 individual regions corresponding to those occupied by the 36 fuel elements in the fuel assembly. The number contained in each region expresses the relative power level at which the element in that region operates. FIGURE 6 thus presents the variation in relative power level in the two transverse directions in fuel assembly, as contrasted to the single direction along a diagonal as shown in FIGURE 5.

In FIGURE 6 it should be noted that the inner corner element present in region 180 has a relative power level of 1.06, a value only 6% higher than the average. The outer corner element present in region 182 at the intersection of thick moderator slabs 110 has the highest relative power level, a value of 1.39, 39% above the average. The other two corner elements in regions 184 and 186 have intermediate values of about 1.22. FIGURE 6 clearly demonstrates that the relative power ratios for fuel elements disposed adjacent a moderator slab are significantly higher than the average values for a given fuel assembly. FIGURE 6 also shows that the relative power levels in the peripheral or outer rows of elements adjacent a moderator slab 110 are higher than the values for fuel rods in the interior of the fuel assembly.

In FIGURE 7 is shown a transverse cross section view of another group of four fuel assemblies each containing a 6 by 6 array of fuel elements and embodying the present invention. The geometry of this group of fuel assemblies is identical to that of the prior art assemblies of FIGURE 4. In FIGURE 7 control elements 34, flow channels 20, thick moderator slabs 110, and thin moderator slabs 112 exist as in FIGURE 4. The fuel assemblies, however, are different to the extent that each has been provided with seven thorium compensation fuel elements. These include outer corner element 190 and the two immediately adjacent elements 192 and 194, corner elements 196 and 198, and elements 200 and 202 immediately adjacent thereto. All of the compensation elements are disposed in two intersecting peripheral rows of fuel elements. They are indicated in the drawing by an encircled T. The innermost corner elements 204 and all other elements in the fuel assembly are regular uranium assemblies containing $U^{238}$ as the principal fertile material, and in addition some thermal neutron fissionable material such as $U^{235}$. They are not compensated, but for purposes of comparison are identical in all respects to the uranium fuel elements described above in connection with FIGURE 4. The seven thorium compensation elements are identical in all respects to the uncompensated elements except that the principal fertile material in the fuel is thorium $Th^{232}$ rather than uranium, and may be enriched with a thermal neutron fissionable material such as $U^{235}$ in an amount determined in the manner described subsequently. In this case, each of these thorium compensation elements has a macroscopic thermal neutron absorption cross section $\Sigma_a$ which is about 21% higher than that of the regular uncompensated uranium elements. The compensation elements are all located adjacent the relatively thick moderator slabs in the otherwise high thermal neutron flux regions of the fuel assembly. Due to their substantially higher thermal neutron absorption, these thorium compensation elements absorb approximately 19% more thermal neutrons than do the uncompensated elements. Thereby the thermal neutron flux peak, which otherwise exists in the region of thick moderator slabs 110 and in the adjacent rows of fuel elements, is reduced.

Referring again to FIGURE 5, the resultant effects of the application of this invention on the fuel assembly thermal neutron flux and relative power levels is shown. In the left hand portion of FIGURE 5, lower curve 210 illustrates the smoothed variation in thermal neutron flux along diagonal 188 in FIGURE 7. The thermal neutron flux values in region 150 of FIGURE 5 are about 5% lower than those for the conventional uncompensated uranium fuel elements as shown by curve 160. The extent of thermal neutron flux reduction decreases with distance along the diagonal until point 164 is reached corresponding to the innermost uncompensated rod position. The reduction in thermal neutron flux as such, however, is of no substantial significance where the power output limitation occurs as a function of relative power level (or central fuel element temperature) of a given element in the fuel assembly. The effect of the present invention on relative power is shown in the right hand portion of FIGURE 5 where lower curve 214 shows the variation in relative power along diagonal 188 of FIGURE 7. Power curve 214 ends adjacent points 216 and 218 for the same reasons given above in regard to points 168 and 170. The relative power level of the hottest outer corner element has been reduced in the present instance by about 25 percent, to a value which is only about 14% above the average. This relative power level should be contrasted with the conventional uncompensated uranium fuel assembly in which the relative power level for the corresponding element is about 39% above the average.

Figure 8:
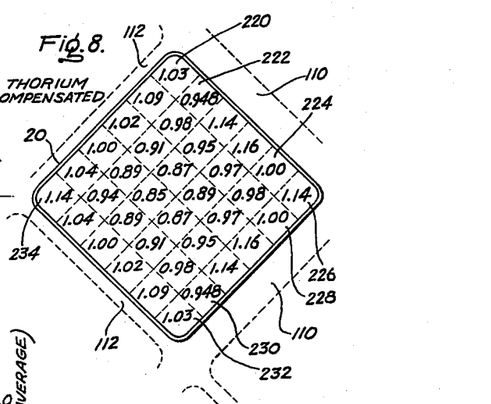
FIGURE 8 is a contour map of the right hand fuel assembly of FIGURE 7 showing the substantially reduced spatial variation in values of relative power levels obtained in the fuel assembly of FIGURE 7 through the use of this invention.

This effect is further clarified by reference to FIGURE 8, a contour plot of the relative power levels for each of the 36 fuel elements in the right hand fuel assembly shown in FIGURE 7. FIGURE 8 clearly illustrates, on comparison with the values in FIGURE 6, the very substantial reductions in relative power level values throughout the fuel assembly of this invention. The seven thorium compensation elements are located in regions 220, 222, 224, 226, 228, 230, and 232 of FIGURE 8. All the remaining regions contain regular uncompensated uranium elements. The innermost corner element (uncompensated) in region 234 has a relative power level of 1.14 which is somewhat higher than the values for most of the other uncompensated elements. The outermost corner element present in region 226 shows a relative power level of 1.14 also which is 25% lower than the relative power level in region 182 of FIGURE 6, a corresponding position.

The effects upon the power output and the fuel lifetime of substituting the improved thorium compensated fuel of this invention for the conventional uncompensated uranium fuel in a power reactor system such as shown in FIGURE 1 above are illustrated by the following Examples 1 through 7.

EXAMPLE 1

An uncompensated uranium prior art fuel assembly as illustrated in FIGURE 4 consists of 36 rod type fuel elements about 10 feet long overall arranged in a 6 by 6 square pitch on 0.71 inch centers. Each fuel element consists of four segments joined axially by means of threaded fittings. Each segment is about 27 inches long and consists of a 0.5 inch zirconium alloy clad tube 0.033 inch in wall thickness containing sintered $UO_2$ fuel pellets of at least 95% of theoretical density. The fuel composition is 98.5% $U^{238}O_2$ and 1.50% $U^{235}O_2$ by weight. The fuel assembly is enclosed in an open-ended tubular zirconium alloy flow channel of square cross section. This channel is about 10 feet long, 0.060 inch in wall thickness, and about 4.38 inches in width between outside surfaces of opposite walls.

EXAMPLE 2

In the nuclear power reactor system of FIGURE 1, the fuel of Example 1 may be used. The core is made up of 452 Example 1 fuel assemblies arranged in the shape of a right circular cylinder about 10'-9" in diameter. The assemblies are arranged in square groups of four spaced 0.392 inch between adjacent flow channel surfaces and within this space the narrow longitudinal water slab exists. The various groups of four assemblies are spaced 0.75 inch from adjacent groups forming the wide longitudinal water-filled slabs or regions within which 80 cruciform control poison elements are reciprocable. The total $UO_2$ content of the core is 134,200 pounds, and the overall volumetric moderator-to-fuel ratio throughout the core is 2.17 in the absence of steam voids. The control elements are 2% boron-stainless steel, are about 10 feet long, are 0.375 inch in blade thickness, and have a blade width of 6.5 inches. The control elements are distributed in the central region of the core in the manner shown in FIGURE 4.

The maximum relative power level value within individual fuel assemblies in this example is 2.16, a product of contributions of 1.4 from the axial flux distribution throughout the core, 1.1 from a local peak at the fuel segment ends due to the local power peaking effect caused by a transverse water slab extending through the assembly at the segment end connectors, and 1.4 from a local peak for the hottest corner fuel element. The maximum relative power level value for the entire core is about 3.6 and includes a contribution of 1.67 from the radial flux distribution. These maxima occur with a clean core under boiling conditions with the control elements partially withdrawn.

With the central fuel melting point as a power level limitation, these relative power level values limit the thermal output of this core to 636 mwt. (megawatts, thermal) and under these conditions the total water flow through the core is 25.6 million pounds per hour, steam is produced at 1.5 million pounds per hour, and the gross electrical output is 193 mwe. (megawatts, electrical).

EXAMPLE 3

A thorium compensated modification of the Example 1 fuel assembly is geometrically identical to that assembly, except to the extent that seven regular $UO_2$ elements in the assembly periphery are substituted with the $ThO_2$ compensation elements. The $ThO_2$ elements are identical in size to the $UO_2$ elements, but the fuel composition is 98.5% $ThO_2$, 1.4% $U^{235}O_2$, and 0.1% $U^{238}O_2$ by weight. The seven thorium compensation elements are located as shown in FIGURE 7; that is, the first, second, fifth, and the common sixth element positions in the two intersecting rows of elements adjacent the wide longitudinal water slabs. With the specific composition given, the macroscopic thermal neutron absorption cross section $\Sigma_a$ for the $UO_2$ element is 0.061654 compared to $\Sigma_a$ of 0.0751 for the $ThO_2$ compensation elements, an increase of about 21%. Further, the initial ratio of the number of fissionable atoms produced to those destroyed (the conversion ratio) for the $UO_2$ elements is only 0.68 and for the $ThO_2$ compensation elements is 1.19. Finally, the Doppler coefficient of $ThO_2$ is about 3 times more negative than the value for $UO_2$. The effects of these considerations are detailed in Example 4 below.

EXAMPLE 4

In the nuclear power reactor system of FIGURE 1, the improved fuel assemblies of the present invention detailed in Example 3 may be used. The reactor core is identical to that described in Example 2 except for the substitution of Example 3 fuel assemblies for the Example 1 fuel. The maximum relative power level value in the individual fuel assemblies is reduced by the presence of the thorium compensation elements from 2.16 to 1.78, and the maximum relative power level value for the entire core is reduced from 3.6 to slightly below 3.0. With the same Example 2 thermal limitations on power level, the permissible power level of this core with the improved fuel is 770 mwt., an increase of 134 mwt., and the gross electrical output is 233 mwe., an increase of 40 mwe. Due to the higher conversion ratio in the seven thorium compensation elements, the useful life of these improved fuel assemblies is extended from about 10,000 mwd/t. (megawatt days per ton of contained uranium) for the Example 1 fuel assemblies to about 13,000 mwd/t. (megawatt days per ton of contained uranium and thorium) for the Example 3 fuel. The Doppler coefficient for the improved fuel is considerably more negative and this improves the safety characteristics of a reactor core made up of such fuel by providing a larger prompt negative fuel temperature dependent reactivity during a fast transient. This negative reactivity effect tends to shut the reactor down in case of an accidental large reactivity insertion.

EXAMPLE 5

The segmented fuel element assemblies of Examples 1–4 have three additional moderator slabs extending transverse to the assembly at positions corresponding to the locations of the segment end connectors and perpendicular to the longitudinal water slabs described. Neutron flux peaking occurs in these three transverse moderator slabs causing a power peak of 1.1 to occur in the fuel adjacent the end plugs at each end of each fuel segment. The thorium compensation principles of this invention also apply in the elimination of this power peak. The Example 3 fuel assembly is further modified to include, at each end of all fuel segments in the 29 regular uncompensated $UO_2$ fuel elements, a single 0.5 inch long pellet of the thorium compensation material. The corresponding end pellets in all segments of the seven thorium compensation elements consist of the same thorium compensation material to which has been added 1500 parts per million of dysprosium oxide ($Dy_2O_3$). An equivalent amount of other strong thermal neutron absorber or poison can be used. The local power peak of 1.1 at the segment ends is reduced to 1.0, i.e., it is completely overcome. The resulting permissible power level of the Example 4 power reactor system is 846 mwt. due to the reduction of the overall relative power value of the fuel assembly from 1.78 in Example 4 to a value of 1.62.

EXAMPLE 6

An improved rod-type nuclear fuel assembly having a higher power density and substantially reduced resistance to coolant flow and embodying the present invention comprises a 7 by 7 array of 49 fuel elements spaced 0.599 inch center-to-center on a square pitch. This array is contained in a square tubular stainless steel flow channel about 0.050 inch in wall thickness and 4.380 inches in outside dimension. The corners of the channel are curved on a 0.4375 inch radius. A nose or support piece having a coolant opening and coolant flow control orifice is provided at the lower end of the assembly. A lifting bail is provided at the upper end of the assembly which is also open to coolant flow. Each element is 114.16 inches long with an active fuel length of 110.50 inches. All fuel elements are unsegmented stainless steel tubes sealed by end plugs and contain a continuous fuel body except for the single element at the center of the 7 by 7 array, that is the 4th element in each of the intersecting 4th rows of elements. This center element is made up of 5 tubular segments jointed axially to one another by means of hollow threaded end connectors of circular cross section. The abutting plugs are provided with peripheral raised portions of square cross section. The segmented element is extended through the center opening of four fuel element spacer grids, then turned slightly to engage the corners of the square portions with the grid, thereby supporting a grid at each of 4 positions along the length of the fuel assembly within the channel. This spacer grid comprises an outer band or strip formed into a square shape and provided with external projections to fit smoothly into the flow channel. An intersecting array of spacer wires, spot welded to one another at their intersections and fusion welded at their ends to the edge of the outer band, is provided on the upper and lower edges of each band forming 49 openings between the wire arrays through which the 49 fuel elements extend. The ends of eight unsegmented elements, specifically those in the third and fifth positions in the four peripheral rows of the square 7 by 7 array, are secured by means of threaded and locked end fittings to upper and lower tie plates forming a rigid assembly. The remaining 41 fuel elements are provided at their ends with unthreaded projections extending movably into openings in the tie plates in fixed lateral positions and are spring loaded to permit axial expansion in the assembly. The structural material used in the tie plates, spacer grids, nose piece, and lifting bail is also stainless steel.

Of the 49 fuel elements in each assembly, 39 are "straight-through" unsegmented regular elements containing sintered $UO_2$ of at least 95% theoretical density, and containing 2.50% by weight $U^{235}O_2$ and 97.50% $U^{238}O_2$. One fuel element is segmented as described above, but is a regular fuel element in that it contains $UO_2$ of the same isotopic composition. Nine fuel elements are unsegmented thorium compensation fuel rods according to this invention. The compensation rods contain a mixture of $ThO_2$ and fully enriched $UO_2$; the actual composition being 97.726% $Th^{232}O_2$, 2.117% $U^{235}O_2$, and 0.157% $U^{238}O_2$ by weight. The compensation rods are disposed in this assembly as the first, second, fifth, sixth, and common seventh elements of two intersecting outer or peripheral rows of fuel elements.

The maximum relative power ratio for this fuel assembly is only 1.15. A nuclear power plant of the type illustrated in Example 2 had a reactor thermal rating of 636 mwt. with 452 fuel assemblies provided with stainless clad regular $UO_2$ fuel of 2.5% enrichment. The substitution of 452 high power density fuel assemblies of this example permits increases in thermal rating to 963 mwt. and in electrical rating to 291 mwe. without exceeding the same central fuel melting temperature and the maximum permissible clad temperature limitations of the conventional fuel. This constitutes an improvement of over 50%.

The substantial power rating increase and relative power level decrease in this example are of course due partly to the use of fuel assemblies having unsegmented fuel elements of smaller diameter, the larger number of elements per assembly, and the thorium compensation principles of this invention. The 25% improvement due solely to thorium compensation in the corner elements is illustrated by comparing Example 6 with Example 7 following.

EXAMPLE 7

The maximum relative power ratio of the 7 by 7 fuel assembly otherwise identical to that described in Example 6 is 1.44 when thorium compensation is not utilized. The maximum power level for the Example 6 reactor power system is only 770 mwt. with such fuel. This value is only 75% of the power level of the value obtained when Example 6 fuel embodying this invention is used.

As fuel assemblies are operated at higher and higher power densities in any reactor, and as boiling moderator reactors are operated at higher and higher vapor void content values, the local power peaking problem of prior art fuel assemblies due to these inhomogeneities in moderator-to-fuel ratio becomes worse, and the relative improvement and advantage realized by using the present invention increases.

Figure 9:
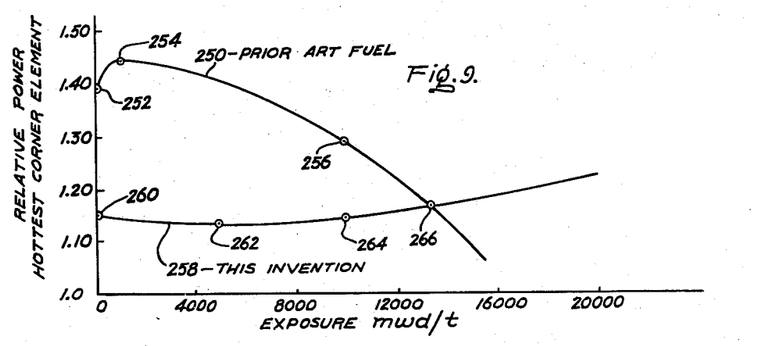
FIGURE 9 is a graph showing the variation in maximum relative power level as a function of the degree of exposure or lifetime of both the prior art fuel assemblies and the fuel assemblies embodying the present invention.

Referring now to FIGURE 9, a graphic comparison is given between the irradiation performance of the uncompensated prior art fuel assemblies and fuel assemblies embodying the present invention. The performances are expressed in terms of relative power of the hottest corner fuel elements in each fuel assembly as a function of fuel exposure measured in terms of megawatt days per ton (mwd./t.) of contained uranium, and thorium, if present. The data given are for the fuel assemblies of the type shown in FIGURES 4 and 7 and described in Examples 1 and 3, except for somewhat different fuel compositions which are given in the following table.

*Table 1*

|  | Prior Art Fuel | Improved Fuel |
|---|---|---|
| $UO_2$ elements: |  |  |
| Number | 36 | 29 |
| $U^{235}O_2$ | 1.60% | 1.60% |
| $U^{238}O_2$ | 98.40% | 98.40% |
|  | 100.0% | 100.0% |
| $ThO_2$ elements: |  |  |
| Number | none | 7 |
| $ThO_2$ |  | 98.50% |
| $U^{235}O_2$ |  | 1.46% |
| $U^{238}O_2$ |  | 0.14% |
|  |  | 100.0% |

In FIGURE 9 curve 250 represents the performance of the uncompensated prior art fuel assembly. The initial relative power level for the hottest corner element is 1.39 as indicated at point 252. During the early irradiation stages to an exposure of about 1000 mwd./t., the relative power level rises to a value of about 1.46 at point 254. This power level increase is due to the relatively rapid buildup of highly fissionable $Pu^{239}$ by irradiation of $U^{238}$ in the corner elements in the thermal neutron flux peak region. Subsequent irradiation causes this relative power peaking to decrease so that by the time the irradiation has proceeded to about 10,000 mwd./t. the relative power level has dropped to about 1.3 at point 256. This gradual decrease is due to the net effect of slower $Pu^{239}$ buildup in the interior or non-peripheral elements of the fuel assembly and the more rapid burnup of the fissionable material in the corner elements.

The lower curve 258 indicates the performance of the thorium compensated fuel assembly embodying the present invention. The initial relative power has a relatively low value of 1.15 at point 260. This is partly due to the slightly decreased enrichment of the corner compensation rods, and the substantially higher thermal neutron absorption in these corner rods due to the presence of $Th^{232}$ rather than $U^{238}$. The relative power level decreases slightly during the initial irradiation stages and falls to a value of about 1.13 at point 262 after the irradiation has proceeded to about 5000 mwd./t. Subsequent irradiation to about 10,000 mwd./t. causes the relative power to rise again slowly to a value of about 1.15 at point 264. The smaller fission cross section of the $U^{233}$ produced in the corner compensation elements compared to the $Pu^{239}$ produced in the regular uncompensated ($UO_2$) elements contributes to the initial time dependent decrease in the relative power production in the thorium compensation elements. The greater conversion ratio of the thorium elements results in an eventual increase in the relative power production in these elements. The initial conversion ratio in the $ThO_2$ compensation elements of this example is 1.19, while the initial conversion ratio of the regular $UO_2$ elements is only 0.68. Thus the compensation elements have a pronounced effect on the neutron economy of the fuel assembly.

Curves 250 and 258 approach each other and cross at point 266 at a time when the exposure has proceeded to about 13,000 mwd./t. This crossover point can be extended substantially if a lower degree of relative power reduction level correction is made in the fuel assemblies of this invention, and advantage is taken of the higher melting point and thermal conductivity of $ThO_2$ relative to $UO_2$ to stay below the central fuel melting temperature. In any event, irradiation beyond this stage produces a situation in which the fuel assembly of the present invention has a higher relative power in the corner elements than does the prior art fuel assembly. This situation is of no substantial significance since after this extent of irradiation the fuel assembly reactivity has dropped sufficiently due to the burnup of a portion of the fissionable material in the fuel so that the power level which can be sustained in such fuel is substantially decreased, and even a high relative power level in the corner elements will not cause the central melting temperature limitations to be exceeded.

It is also possible to rotate the fuel assemblies by 180° after irradiation to 13,000 mwd./t. so that the $ThO_2$ elements originally at the outer corner are moved to a lower neutron flux region near the inner corner, and the $UO_2$ elements of lower power generation are moved into the high neutron flux zone near the large water gap. This rotation produces somewhat of a reduction in the reactivity effect of the fuel assembly since the high reactivity $ThO_2$ elements which contain considerable $U^{233}$ are moved to a region of lower neutron importance. However, the rotation at this crossover point allows increased power production due to the net reduction in relative power of the peripheral fuel elements.

Figure 10:
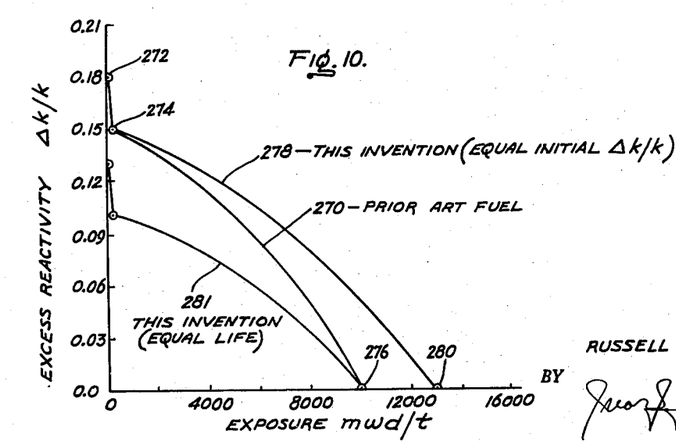
FIGURE 10 is a graph showing the variation in excess reactivity $\Delta k/k$ as a function of the degree of exposure or lifetime of the prior art fuel assemblies and of fuel assemblies embodying the present invention.

Referring now to FIGURE 10, a comparison is shown of the variation in the reactivity in excess of that necessary to sustain criticality, excess reactivity $\Delta k/k$, with exposure of both the prior art and the compensated fuel assembly of this invention in a reactor as described in Example 2. Curve 270 represents the performance of the uncompensated or prior art fuel assemblies of Example 1. The initial $\Delta k/k$ is about 0.18 represented by point 272. During the initial stages of irradiation the value of $\Delta k/k$ drops rapidly to a value of about 0.15 at point 274 due to the rapid generation of fission product xenon in the fuel. Subsequent irradiation involves an equilibrium where this xenon poison is destroyed by neutron irradiation approximately as fast as it is generated and the initial rapid drop in $\Delta k/k$ stops. Curve 270 thereafter slopes relatively gradually downward to the right showing as decrease in $\Delta k/k$ as the fissionable content of the fuel burns up with irradiation. Ultimately point 276 is reached which can be taken as the end of life of the fuel assembly. At this point the fuel assembly is incapable of providing any excess reactivity over and above that necessary to sustain criticality. For the prior art fuel assemblies of Example 1, this end of life is approximately 10,000 mwd./t.

Curve 278 represents the corresponding performance of the Example 3 compensated fuel assemblies of the present invention. For purposes of comparing permissible fuel life, the assemblies have the same initial excess reactivity $\Delta k/k$ in the beginning and this is represented by point 272. Fission product xenon in the early stages causes a substantially identical drop in $\Delta k/k$ to point 274 as before. However, curve 278 has a considerably smaller downward slope to the right than does curve 270. The end of life represented by point 280 for the compensated fuel assemblies of this invention occurs after approximately 13,000 mwd./t. of exposure. The thorium compensation principles of this invention thus provide a substantial increase in permissible exposure, in addition to the substantial decrease in local power peaking and the substantial increase in power level at which the fuel may be operated. The extension of useful life of the fuel is due to reduced depletion of the thermal neutron fissionable uranium due to the conversion of $Th^{232}$ to $U^{233}$, which is greater than the conversion of $U^{238}$ to $Pu^{239}$, and the important, more advantageous nuclear characteristics of $U^{233}$. As described above, the initial conversion ratio in the thorium compensation elements is 1.19 as compared to an initial conversion ratio of only 0.68 in the $UO_2$ elements. Therefore, initially in reactor life for every 100 fissionable atoms destroyed in the $ThO_2$, 119 new fissionable atoms are produced. For every 100 fissionable atoms destroyed in the regular $UO_2$ elements, only 68 new fissionable atoms are produced. In addition, the $ThO_2$ elements are located in the peripheral local high flux zone of the assembly and therefore have a greater statistical weight or importance relative to the regular $UO_2$ elements in the same assembly. The fissionable material ($U^{233}$) produced in the $ThO_2$ elements has much better nuclear characteristics than the $Pu^{239}$ produced in the $UO_2$ elements. On the average, approximately 40% more neutrons are produced per fission in $U^{233}$ than in $Pu^{239}$. However, the fission cross section of $U^{233}$ is only about 35% of that of $Pu^{239}$ in a typical power reactor neutron spectrum. The net result of all these considerations is as shown in FIGURE 9 where this invention prevents an increase in power production in the thorium compensation elements even though the conversion ratio is much greater.

FIGURE 10 also presents curves 270 and 281 permitting a comparison of the required excess reactivities for prior art and improved fuel of equal life. All of the otherwise permissible increased exposure of the fuel of this invention (curve 278) can be foregone by taking advantage of the reduced initial reactivity and enrichment needed to reach the same exposure as that of the prior art fuel (curve 270). The initial excess reactivity which must be balanced by control poison elements in the reactor core is reduced from 0.18 $\Delta k/k$ to about 0.13 $\Delta k/k$ with a corresponding reduction in initial fuel enrichment. Clearly intermediate conditions are possible where both increased exposure and higher power levels are simultaneously realized.

EXAMPLES 8-12

Figure 11:
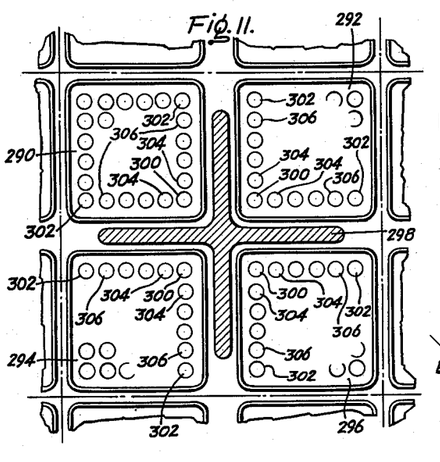
FIGURE 11 is a transverse cross section view of another group of four fuel assemblies spaced apart from one another by a relatively large slab of liquid moderator within which a cruciform control element is reciprocable and in the description of which is described the beneficial effects on the maximum relative power level in these assemblies of applying the thorium compensation principles of the present invention to these assemblies in different degrees.

In FIGURE 11 four adjacent fuel assemblies 290, 292, 294, and 296 as a group are shown arranged in the four quadrants provided between the blades of cruciform control poison element 298. Thorium compensation elements were substituted in various numbers for regular uranium elements in a critical assembly of the geometry shown in FIGURE 11. Experimental measurements were made to determine the improvement in relative neutron flux and power levels resulting from such substitution. The isotopic composition of the regular uranium and the thorium compensation fuels are given in Table 2.

*Table 2*

| Ingredient | Regular $UO_2$ Elements | $ThO_2$ Compensation Elements |
|---|---|---|
| $Th^{232}O_2$ | none | 98.4% |
| $U^{235}O_2$ | 1.6% | 1.5% |
| $U^{238}O_2$ | 93.4% | 0.1% |
| | 100.0% | 100.0% |

The following data presented in Table 3 illustrate as specific Examples 8-12 the improvements in relative power for these fuel assemblies as various peripheral $UO_2$ elements are replaced by the thorium compensation elements according to this invention. These data were taken from critical assembly measurements in which low power irradiation was effected with the control element withdrawn and in which gamma traverse and other tests of the individual fuel elements were conducted. In Examples 8-12 the measured relative neutron flux levels taken for each test are given. The number and location of the compensation elements in each test are given by reference to the fuel elements shown in FIGURE 11.

*Table 3*

| Example No. | No. of $ThO_2$ Elements per Assembly | $ThO_2$ Element Location (Figure 11) | Relative Neutron Flux | Relative Power Level |
|---|---|---|---|---|
| 8 | 0 | | 1.54 | 1.53 |
| 9 | 1 | 300 | 1.44 | 1.28 |
| 10 | 3 | 300, 302 | 1.40 | 1.32 |
| 11 | 5 | 300, 302, 304 | 1.39 | 1.21 |
| 12 | 7 | 300, 302, 304, 306 | 1.38 | 1.23 |

The relative power peak is reduced from 53 percent above the average in Example 8 to 23 percent above the average in Example 12, or a reduction of 30 percent. The relative neutron flux is reduced from 54 percent above the average in Example 8 to 38 percent above the average in Example 12, or a reduction of 16 percent. The Example 12 maximum relative power value is slightly higher than the value in Example 11, but this is a result of the fact that elements 306 added in Example 12 were over compensated, i.e., had a higher than necessary value of $\Sigma_a$ to correct the power peak existing at that point. They thus ran at lower than average power levels, depressed the average, and gave the hottest element a slightly higher relative power value of 1.23. However, the difference in power peaking between Examples 11 and 12 is small and the increased quantity of $ThO_2$ in the lattice of Example 12 results in increased neutron economy and exposure. The degree of power peaking compensation according to this invention can be made practically perfect by selecting the fissionable material concentration for each thorium compensation element on the basis of its particular position in the assembly, and the local flux peak otherwise existing at that position. It is within the contemplation of this invention to provide an assembly having compensation elements with a variety of fissionable atom concentrations, although pratical economic considerations may limit the degree to which this is done.

Figure 12:
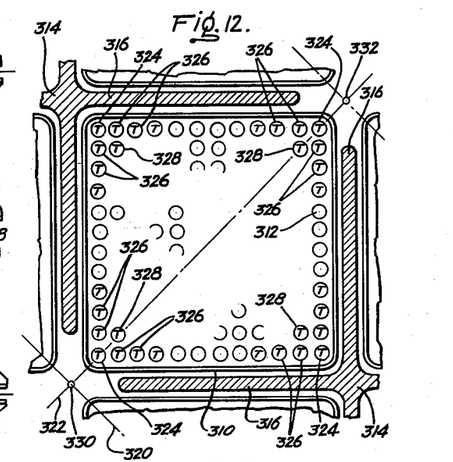
FIGURE 12 is a transverse cross section view of a large fuel assembly having on the order of 100 individual rod type fuel elements illustrating the embodiment of the present invention in such large fuel assemblies.

In FIGURE 12 is shown another common form of rod type nuclear reactor fuel assembly in which the number of fuel elements is approximately 3 to 4 times the number in the individual assemblies previously described. It can readily be seen that in this larger lattice the control element blades can be made substantially larger. In FIGURE 12 flow channel 310 of tubular form and of square cross section surrounds an array of 144 fuel elements 312 arranged on a square pitch as a 12 by 12 array. Adjacent opposite corners of this fuel assembly are located large cruciform control elements 314, the blades 316 of which extend substantially along the entire sides of the fuel assembly. Broken lines 138, 320, and 322 indicate the positions of the members of an egg-crate type reactor core support grid to permit the use of these enlarged control and fuel elements.

The number of thorium compensation elements according to this invention employed in reducing the relative power of the corner elements in this fuel assembly is 32. In FIGURE 12 the compensation elements are indicated as before. The thorium compensation elements include the four corner elements 324, the three elements 326 in the intersecting outer rows of peripheral elements adjacent corner elements 324, and in addition four elements 328. It should be noted that the elements 328 are not peripheral fuel rods. It has been found that a substantial improvement in relative power value is obtained in fuel assemblies of this size range, specifically those which are about 9 by 9 or larger, through the additional compensation of these elements 328 which are immediately adjacent the peripheral corner elements. At least the major portion of the compensation elements are located in the outer or peripheral rows of elements.

A specific example of a nuclear reactor having a core made up of such fuel assemblies according to this invention and as shown in FIGURE 12 is given below in Example 13.

Example 13

Following are the significant data concerning an organic liquid moderated and cooled power reactor provided with fuel assemblies embodying the present invention as shown in FIGURE 12. The reactor vessel is 68 feet high and 13.5 feet outside diameter. It has a 2 inch thick wall and is designed to operate at a pressure of about 100 p.s.i.a. The top head is flanged and bolted. The control rod drive penetrations extend through the bottom head. The reactor core is approximately circular in cross section, having an equivalent diameter of 132 inches. The active or fuel-containing portion of the core is 144 inches in length. The reactor core contains fuel assemblies within stainless steel flow channels each having a wall thickness of 0.035 inches, an outside width of 5.125 inches, and a length of about 13.5 feet. The volumetric moderator-to-fuel ratio is about 2.9. There are 40 reciprocable control poison elements distributed in the core. The control elements are hollow and of square cross section with a 4.87 inch outside width and a 0.625 inch thick wall. The control poison is boron stainless steel.

The fuel assemblies each contain 100 cylindrical unsegmented fuel elements 154 inches long arranged in a 10 by 10 square array on 0.505 inch centers. The elements are provided with an extruded sintered aluminum product (approximately 93% aluminum and 7% aluminum oxide) clad tube having 10 equally spaced longitudinal and slightly helical fins. The maximum and root diameters of the clad tube are 0.502 and 0.303 inches respectively and the radial wall thickness of the tube is 0.015 inches. The fuel in the 76 regular fuel elements in each fuel assembly is sintered high density $UO_2$ containing 2.50% $U^{235}O_2$, the pellets being 0.272 inch outside diameter. Six thorium compensation elements are located symmetrically at each corner of the square fuel assembly, including 5 in the peripheral element row and one diagonally in from the peripheral corner element similar to the arrangement of FIGURE 12. The compensation fuel consists of a sintered high density mixture of $ThO_2$ and $UO_2$ of about 17% enrichment. Its isotopic composition is given below in Table 4.

Table 4

| Component: | Weight, Percent |
|---|---|
| $Th^{232}O_2$ | 87.3 |
| $U^{238}O_2$ | 10.5 |
| $U^{235}O_2$ | 2.2 |
| | 100.0 |

The reactor core operates without central fuel melting at a power level of 1500 thermal megawatts. It is cooled and moderated by 82 million pounds per hour of a high-boiling hydrocarbon liquid having approximately the following composition:

Table 5

| Component: | Volume, Percent |
|---|---|
| Ortho-terphenyl | 7 |
| Meta-terphenyl | 42 |
| Para-terphenyl | 21 |
| Higher boiling pyrolylic and radiolytic decomposition products or polymer | 30 |
| Total | 100 |

This liquid is pumped upwardly through the reactor core, entering at about 550° F. and leaving at about 670° F. The exit coolant is cooled indirectly in a steam generator system which produces 5.13 million pounds of superheated steam per hour at a temperature and pressure respectively of 650° F. and 600 p.s.i.g. The plant load is 450 megawatt steam turbine-generator system. The power density of the reactor core is approximately 55 kilowatts per liter. This may be compared with the customary power density of about 32 kilowatts per liter in conventional organically cooled and moderated reactors utilizing conventional fuel assemblies which do not employ the thorium compensation principles of this invention.

There is a modification of the lattice shown in FIGURE 12 to which this present invention is also applicable. This modification involves essentially a reduction in the size of the blades 316 of control elements 314 shown in FIGURE 12 so that the blade width extends approximately to the mid-point of the side of each fuel assembly and the addition of two identical control elements at points 330 and 332 shown in FIGURE 12. The improved performance by the application of the present invention is also realized in this modified lattice.

Figures 13, 14, 15, 16, 17:
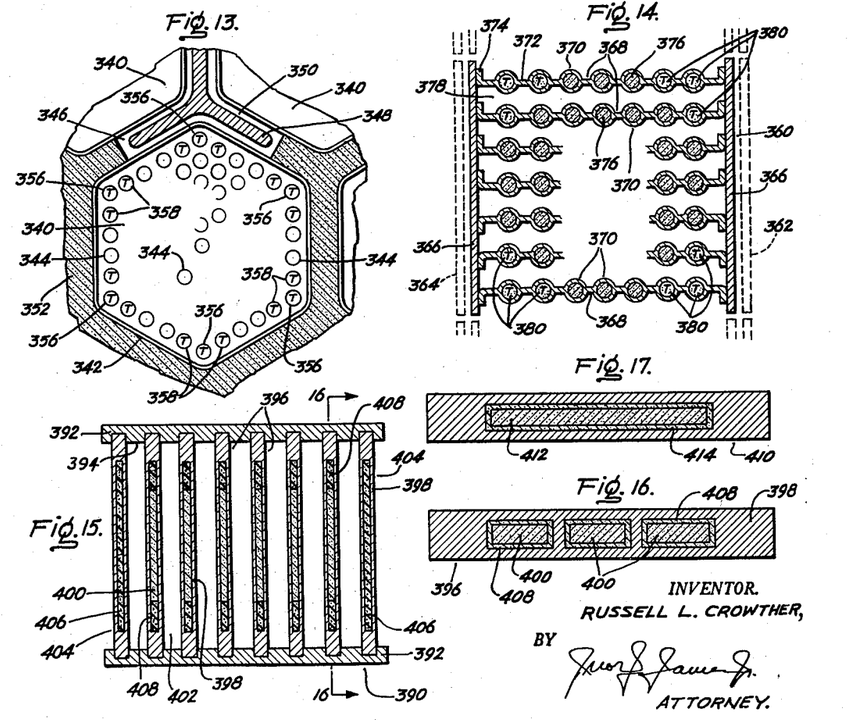
FIGURE 13 is a transverse cross section view of the embodiment of the present invention in rod type fuel assemblies having fuel elements arranged on a triangular pitch to form a hexagonal fuel assembly.
FIGURE 14 is a transverse cross section view of a plate type fuel assembly embodying the present invention to overcome power peaking at the corners of such assemblies.
FIGURE 15 is a transverse cross section view of another modification of plate type fuel assemblies embodying the present invention to correct power peaking around the entire periphery of such assemblies.
FIGURE 16 is a side view in cross section of one of the inner fuel plates of the assembly of FIGURE 15.
FIGURE 17 is a similar view of an alternative form of fuel plate.

In FIGURE 13 is shown a partial transverse cross section view of a reactor lattice in which the individual fuel elements are arranged on a triangular pitch rather than on a square pitch as in the preceding discussion. Fuel assembly 340 is provided with a flow channel 342 having a hexagonal cross section and enclosing a plurality of individual fuel elements 344. A gaseous coolant such as carbon dioxide, steam, nitrogen, helium, or the like flows through the region enclosed by flow channel 342 in direct contact with the fuel elements. The individual fuel assemblies are separated from each other in the reactor core and in the space so provided is positioned a body 352 of solid moderator, such as beryllium or zirconium hydride, and reciprocable triflute control poison elements 348 having blades 350. The control elements are provided with moderator followers. Thermal neutron flux peaking in the moderator-filled regions between the individual fuel assemblies 340 causes power peaking in the peripheral rows and especially at the corners of such hexagonal fuel assemblies through the mechanisms previously described. Fuel elements 344 other than those at and near the corners of the hexagonal array are regular $UO_2$-containing fuel elements. The corner elements 356, of which there are six in this lattice, are thorium compensation elements. In addition, the two elements 358 immediately adjacent each corner element in the peripheral rows are also compensation elements. Another specific example of a nuclear reactor utilizing fuel assemblies as illustrated in FIGURE 13 and another coolant and moderator is given immediately below in Example 14.

Example 14

A power reactor moderated and cooled by pressurized (non-boiling) light water utilizes fuel assemblies of the type shown in FIGURE 13. The reactor vessel is 12.0 feet outside diameter, has a wall thickness of 9 inches including an internal stainless steel lining, and is 35.7 feet in outside height. The top head is flanged and bolted and provided with penetrations through which top mounted control rod drive mechanisms actuate 24 control poison elements with fuel followers. The reactor core is approximately circular in cross section. The core consists of 97 hexagonal flow channels fabricated of 0.050 inch thick type 304 stainless steel. Six additional half-channels of approximately trapezoidal cross section are spaced 60° apart from one another around the periphery of the core structure to complete the circular cross section. The channels are 9.64 inches inside dimension measured between opposite corners.

Each hexagonal fuel assembly contains 215 cylindrical unsegmented fuel elements arranged on 0.566 inch centers in a triangular pitch to form the hexagonal array. Each element is 0.400 inch outside diameter, and has a 0.022 inch thick stainless steel clad tube. In each assembly there are 185 regular fuel elements each filled with sintered $UO_2$ pellets containing 3.0% $U^{235}O_2$. There are 30 $ThO_2$ compensation fuel elements, 5 such being located symmetrically in the peripheral row of fuel elements at each of the 6 corners of the hexagonal fuel assembly. These rods contain 97.5% $ThO_2$ and 2.5% fully enriched $U^{235}O_2$. Each fuel assembly measures about 8.4 inches between opposite sides and about 9.5 inches across the opposite corners. The volumetric moderator-to-fuel ratio is about 2.3.

The reactor core operates without central fuel melting at 690 mwt. compared to the maximum rating of 510 mwt. using regular $UO_2$ fuel without corner element compensation. The core is cooled and moderated by light water flowing at a rate of 45 million pounds per hour through the flow channels, entering the core at about 580° F. and leaving at about 620° F. The system pressure is 2000 p.s.i.g. This coolant is circulated from the reactor vessel through steam generators which evaporate 2.8 million pounds of water at 1065 p.s.i.g. and 545° F. This steam drives a steam turbine-generator which delivers a net electrical output of 236 mwe. The power density is about 50 kilowatts per liter of core volume.

In FIGURE 14 is shown a transverse cross section view of a plate type fuel assembly 360. A specific example of such fuel is given in the following description. Nuclear reactor cores may be made up of a plurality of assemblies of this type as indicated by broken lines 362 and 364. This is representative of the kind of fuel assemblies described in U.S. Patent No. 2,838,452 and as employed in the Borax IV experiments at the National Reactor Testing Station near Idaho Falls, Idaho. This kind of fuel assembly is fabricated with a pair of parallel side plates 366, between which is secured a plurality of fuel plates 368. Each fuel plate 368 is an extrusion of a material, such as an aluminum alloy, providing a plurality of tubular portions 370 interconnected in a parallel spaced configuration by means of connecting portions 372. The edges of the plate elements are turned at an angle at 374 and secured to the side plates by welding or other means. The tubular portion 370 is filled with a body of fuel 376. The coolant, such as water, is passed through channels 378 between the individual fuel plates. The body of fuel material 376 is $UO_2$ of about 90% theoretical density and containing 3.6% $U^{235}O_2$. The diameter of the fuel body is 0.255 inches, its total length is 24.75 inches, and the center-to-center spacing of the individual fuel bodies is 0.464 inches. There are eight tubular portions in each fuel plate and each fuel assembly contains six such plates spaced 0.604 inches center-to-center. Each fuel assembly contains 348 grams of $U^{235}O_2$ and 50 such fuel assemblies provide a critical configuration or core suitable for power generation purposes through boiling a light water moderator coolant in the core. The power level of such a core is limited to about 25 mwt. due to flux and power peaking. By employing the present invention and substituting compensation fuel analysing 97.8% $ThO_2$ and 2.2% fully enriched $UO_2$, the peaking effect is substantially reduced and the power level is raised to about 32.5 mwt. without exceeding the central fuel melting temperature in the corner elements.

Referring to FIGURE 15, a second form of plate type nuclear reactor fuel assembly 390 is shown. This fuel assembly consists of a pair of parallel side plates 392 grooved on their inner surfaces 394 to receive the lateral edges of fuel plates 396. Each fuel plate consists of an outer layer of clad 398 enclosing an inner fuel-containing layer 400. A liquid moderating coolant such as light water is passed through the spaces 402 existing between the adjacent fuel plates 396. Thermal neutron flux and power peaking occur around the periphery of each such assembly and the present invention is applicable to such fuel assemblies for the purposes herein stated. In FIGURE 15 the outer or peripheral fuel plates 404 are provided with thorium compensation fuel according to the principles of this invention. In the present case the enclosed fuel containing layer 406 in the outer plates consists of a mixture of 85% thorium, 2.5% $U^{235}O_2$ and 12.5% $U^{238}O_2$ as an oxide-metallic dispersion. The remaining fuel plates disposed in the assemblies are provided with a fuel-containing layer 400 in central regions only and which consists of enriched uranium in an aluminum intermetallic. The outer edges of these intermediate fuel plates are each provided with a strip 408 containing the thorium compensation material. The effect of thorium compensation of these strips and the outer plates is to reduce flux and power peaking which otherwise occurs adjacent the edges of the intermediate fuel plates and at the outer plates due to the slab of moderator present between the individual fuel assemblies in the core.

In FIGURE 16 is shown a cross section view of one of the interior (non-peripheral) plate elements 396 of FIGURE 15 assembly. The element contains a plurality of segments or sections, each containing a layer 400 of fuel material within clad layer 398. The local thermal neutron flux peaking which otherwise occurs at the ends as well as at the lateral edges of these spaced fuel layers 400 is compensated for by providing thorium compensation material as strips 408.

In FIGURE 17 is shown an alternative form of plate element 410 comprising a single segment and containing a layer of fuel material 412 with thorium compensation strips 414 in the local high thermal neutron flux regions at the ends and edges (the entire periphery) of the fuel layer.

Figure 17A:
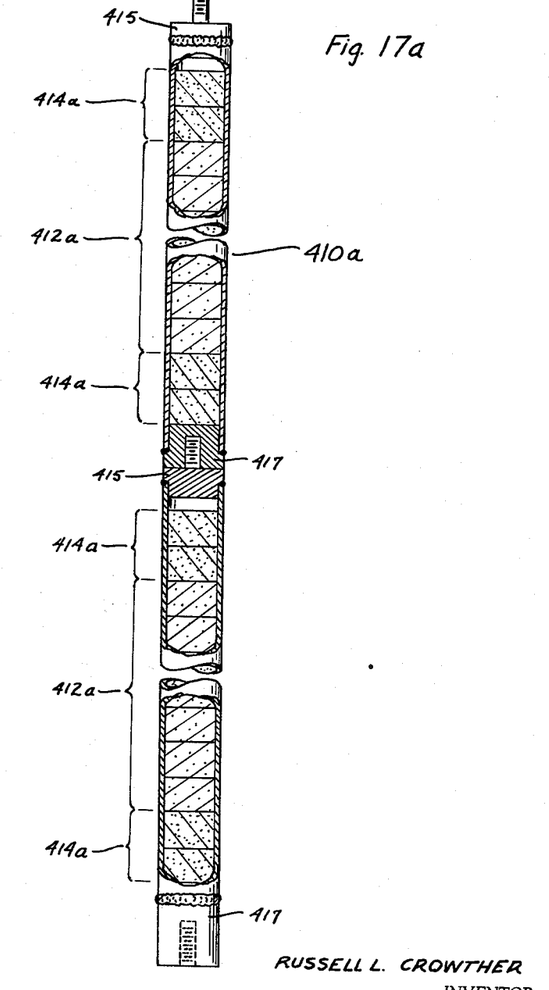
FIGURE 17a is a similar view of a compensated fuel element of the rod type.

In FIGURE 17a is shown an alternative form of rod type fuel element 410a comprising two tubular segments of circular cross section and each containing a body of first nuclear fuel material 412a with bodies 414a of second fuel (thorium compensation) material placed in the local high thermal neutron flux regions near the ends of the segments adjacent the segment sealing means 415 and 417.

Figure 18:
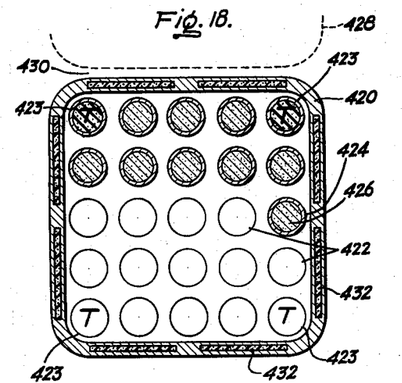
FIGURES 18 and 19 are transverse cross section views of rod type and plate type fuel assemblies in which the thorium compensation material is disposed separate from the fuel and in the structural material associated with each fuel assembly.

In FIGURE 18 a transverse cross section view of another rod type fuel assembly is shown. A 5 by 5 square pitch array of elements is shown as representative only, the number of rods can be changed and triangular or other pitches may be substituted. A coolant flow channel 420 surrounds a plurality of fuel elements 422 each consisting of a clad tube 424 enclosing a fuel body 426. An adjacent fuel assembly is indicated by 428, and a slab of moderator exists in space 430 between the adjacent assemblies as described above. In this embodiment of the invention the thorium compensation material is disposed in the channel 420 as one or more bodies 432, and are thus separate from the fuel. The compensation material is, however, located adjacent the peripheral rows of fuel elements 422 in the local high thermal neutron flux regions in and near the moderator slabs surrounding the assembly and is effective to reduce the thermal neutron and power peaking in the peripheral fuel elements. The corner elements 423 also contain thorium compensation material.

Figure 19:
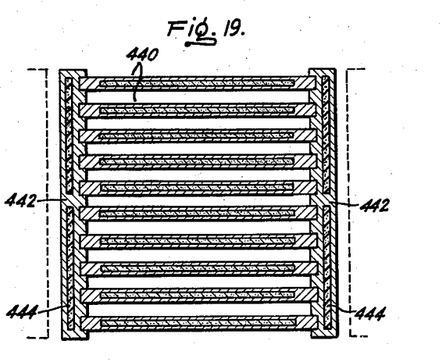

In FIGURE 19 a transverse cross section view of a plate type fuel assembly is shown between other adjacent elements. This assembly includes fuel plate elements 440 supported at their edges by side plates 442. The thorium compensation material is disposed in the side plates as bodies 444 for the same purposes as stated above in the description.

The thorium compensation material can also be distributed as a dispersion or as an alloy or in other forms throughout the channel or side plate supporting structures of FIGURES 18 and 19 if desired.

The macroscopic thermal neutron absorption cross section of a fuel material referred to in the foregoing description, is expressed by $\Sigma_a$ which is given by the following equation:

$$\Sigma_a = \frac{\rho N_a}{M}(v_1\sigma_1 + v_2\sigma_2 + \cdots v_i\sigma_i)$$

where $\rho$ is the density of the fuel material in grams per cc., $N_a$ is Avogadro's number ($6.06 \times 10^{23}$) atoms per gram atom, $M$ is the atomic weight in grams per gram atom, $v$ is the fraction of atoms present of a given kind, and $\sigma$ is the microscopic thermal neutron absorption cross section of atoms of a given kind.

The foregoing description of the application of this invention to nuclear reactor core structures, and to the individual fuel element and fuel element assemblies making up such structures, will serve to describe to those skilled in the art the manner of making and using it, and the advantages of such use, in virtually any form of heterogeneous fuel nuclear reactor operating with a thermal neutron energy spectrum and in which structural or other inhomogeneities produce a non-uniform thermal neutron flux distribution including local regions of relatively high thermal neutron flux to which a portion of the fuel element or an assembly of such elements is exposed. The determination of the concentration of thermal neutron fissionable material in the compensation elements according to this invention is by standard reactor design methods. An iterative solution is conducted on the basis of the following relationship:

$$e_c = (Y+\Delta)\left(\frac{\bar{\sigma}f_{uc}}{\bar{\sigma}f_c}\right)\left(\frac{\bar{\phi}_{uc}}{\bar{\phi}_c}\right)\left(\frac{\rho_{uc}}{\rho_c}\right)\left(\frac{M_c}{M_{uc}}\right)e_{uc}$$

where the subscripts $c$ and $uc$ denote the compensated and uncompensated regions, respectively, of the device considered, and $e$ = atoms of fissionable material per atom of total mixture
$\bar{\sigma}_f$ = the spectrum-weighted microscopic fission cross section of the fissionable material in the specified region (see H. Hurtwitz et al. "Neutron Thermalization." Nuclear Science and Engineering, 1, 280–312 (1956) for description of a method for determination of the thermal neutron spectrum in a reactor core)
$\rho$ = density of the designated region in gm./cc.
$M$ = atomic or molecular weight of the designated region in gm./gm.-atom or gm./gm.-mole
$\phi$ = the average neutron flux in the designated region in neutrons/cm.$^2$-sec. which may be determined by one-, two-, or three-dimensional diffusion theory or a higher order transport approximation referred to in greater detail below.
$Y$ = the ratio of the relative power in a compensation region to the relative power which would exist in a regular or uncompensated region located in the same position; $Y$ is always equal to or less than 1.0;
$\Delta$ = the relative power generation advantage of the compensated region as a result of change in thermal conductivity, size, or melting point.

The flux ratio, $$\left(\frac{\bar{\phi}_{uc}}{\bar{\phi}_c}\right)$$

appearing in the equation above, is a function of a number of variables, i.e.

$$\left(\frac{\bar{\phi}_{uc}}{\bar{\phi}_c}\right) = f(e_c, \bar{\sigma}a_c, \bar{\sigma}a_{uc}, \bar{\sigma}f_c, \bar{\sigma}f_{uc}, \rho_m, \rho_c, \rho_{uc}, M_{uc}, M_c, e_{uc},$$
$$\overline{\Sigma}a_m, \overline{\Sigma}a_s, \overline{\Sigma}sl_m, \overline{\Sigma}sl_c, \overline{\Sigma}sl_{uc}, \overline{\Sigma}sl_s, D_m, D_c, D_{uc}, D_s)$$

where the subscripts $m$ and $s$ denote moderator and structure regions, respectively, and $\sigma_a$ = the spectrum-weighted microscopic absorption cross section of the designated region determined in a manner similar to $\bar{\sigma}_f$
$\overline{\Sigma}_a$ = the spectral weighted macroscopic absorption cross section of the designated region
$\overline{\Sigma}_{sl}$ = the spectrum-weighted macroscopic slowing down cross section of the designated region
$D$ = the spectrum-weighted diffusion coefficient of the designated region.

One of the variables in the determination $$\left(\frac{\bar{\phi}_{uc}}{\bar{\phi}_c}\right)$$

is $e_c$ and therefore, in most practical instances an iterative calculation is required. The quantities described in the preceding relationships vary with fuel exposure. This variation must be considered in determination of the optimal initial design characteristics of the compensated region. The relative flux ratio $$\left(\frac{\bar{\phi}_{uc}}{\bar{\phi}_c}\right)$$

may be determined by solution of the well known steady-state Boltzmann equation $$\Omega \cdot \nabla \phi(r,\Omega,E) + \Sigma_t(r,E)\phi(r,\Omega,E)$$
$$= S(r,\Omega,E) + \int_{\Omega'} \Sigma_s(r,E,\Omega',\Omega)\phi(r,E,\Omega')d\Omega'$$

where $r$, $\Omega$, and $E$ define the functional dependency in position, direction, and energy, respectively, and $\Sigma_s$ is the scattering cross section, $\Sigma_t$ is the total cross section, and $S$ is the source. For example see B. Davison, "Neutron Transport Theory," Oxford (1957). In many cases of practical interest the Boltzmann equation can be simplified to the well known steady-state neutron diffusion equation $$-\nabla \cdot D(r,E)\nabla \phi(r,E) + [\Sigma_a(r,E) + \Sigma_{sl}(r,E)]\phi(r,E)$$
$$= S(r,E)$$

which provides a simpler method of solution for $$\left(\frac{\bar{\phi}_{uc}}{\bar{\phi}_c}\right)$$

A number of standard analytical and numerical methods are available for solution of the diffusion equation in space and energy. For example see E. L. Wachspress, "Cure: A Generalized Two-Space-Dimension Multigroup Coding for the IBM–704," KAPL–1754 (1957); D. S. McCarty et al., "DRACO—A Three-Dimensional Few-Group Depletion Code for the IBM–704," WAPD–TM–137 (1958); and S. Glasstone and M. Edlund, "The Elements of Nuclear Reactor Theory," D. Van Nostrand 1952.

The value of $\Sigma_a$ for the thorium compensation material is stated above to be initially at least equal to $\Sigma_a$ for the regular uranium-containing fuel material. Depending on the extent of relative power correction and exposure increase desired, the $\Sigma_a$ for the compensation should not exceed about 5.0 times the value for the uranium fuel material. This $\Sigma_a$ range of 1.0 to 5.0 also applies to the third fuel material referred to herein and which consists of thorium compensation fuel containing an added strong neutron absorber and used to compensate the segment ends in a thorium compensation element. Also, it should be noted that the bodies of thorium compensation material and the segments or elements containing the material may be made the same size, larger, or smaller than the bodies of regular uranium fuel.

Nuclear fuel suitable for use in the regular or uncompensated uranium fuel regions of reactor fuel embodying the present invention includes $U^{238}$ with naturally occurring or artificially added proportions of the thermal neutron fissionable isotopes $U^{233}$, $U^{235}$, $Pu^{239}$, $Pu^{241}$, and any others which are available. Nuclear fuel suitable for use in the thorium compensation regions of reactor fuel embodying this invention include $Th^{232}$ with or without added quantities of any of the above-mentioned thermal neutron fissionable isotopes. The amounts of these materials contained in a given region are determined as above described to provide a macroscopic thermal neutron absorption cross section $\Sigma_a$ in the compensation element which is initially at least equal to corresponding value of the regular elements. The fertile and fissionable fuels in both the regular and compensation elements may be employed in elemental form as the metals, or as mixtures of metals such as the alloys or intermetallics, or as chemical compounds such as the oxides, carbides, nitrides, silicides, and the like, or otherwise.

The present invention is applicable in reactors and fuel for such reactors independent of the actual identity of the neutron moderating substance used. Neutron moderators are well known to be the materials containing atoms of low atomic weight and low thermal neutron absorption cross sections, and typical moderators include graphite, hydrogen, deuterium, light and heavy water, hydrocarbon or deuterocarbon compounds (organic), beryllium, beryllium oxide, zirconium hydride, and the like. Any one or a combination of such materials may be used.

Similarly, the use of the present invention is independent of the nature of the control poison elements, and any of the various known nuclear fission reaction poisons may be used. These include boron, cadmium, gadolinium, silver, dysprosium, samuarium, europium, hafnium, mercury, and other elements having high non-fission neutron capture cross sections. These nuclear fission reaction poisons may be used in solid, semi-solid, or as liquids in molten or solution form, and in elemental, mixture, or compound form. Further, these poison materials may also be added to the thorium compensation material to produce the third fuel material for use in any local high thermal neutron flux regions of the ends of segments of a thorium compensaion fuel elements as described above in Example 5.

This invention is also applicable to any reactor of the type referred to herein regardless of the nature of the reactor coolant.

As structural materials in the apparatus of this invention, such materials as stainless steel, aluminum and its alloys, zirconium and its alloys, and nickel and its alloys may be used.

Several specific embodiments of this invention have been described in considerable detail by way of illustration. It should be understood that various other modifications and adaptations thereof may be made by those skilled in this particular art without departing from the spirit and scope of this invention as set forth in the following claims.

I claim:

1. In a device which comprises a first fuel material initially containing $U^{238}$ and a thermal neutron fissionable material, and which upon irradiation by neutrons of thermal energy spectrum is subject to a non-uniform thermal neutron flux distribution including local regions of relatively high thermal neutron flux to which a portion of said device is exposed, the improvement which comprises a second fuel material disposed in said device in said local region of relatively high thermal neutron flux, said second fuel material initially containing $Th^{232}$ and a thermal neutron fissionable material, and having a value of macroscopic thermal neutron absorption cross shection $\Sigma_a$ initially no less than that of said first fuel material.

2. In a nuclear fuel element which comprises a first fuel material initially containing $U^{238}$ and a thermal neutron fissionable material, said element being subject upon neutron irradiation to a non-uniform thermal neutron flux distribution including local regions of relatively high thermal neutron flux to which a portion of said element is exposed, the improvement which comprises a second fuel material initially containing $Th^{232}$ and a thermal neutron fissionable material, and having a value of macroscopic thermal neutron absorption cross section $\Sigma_a$ initially no less than that of said first fuel material, said second fuel material being disposed in said element in said local region of relatively high thermal neutron flux.

3. In a nuclear fuel assembly which comprises a plurality of fuel elements having a first fuel material initially containing $U^{238}$ and a thermal neutron fissionable material, said assembly being subject upon neutron irradiation to a non-uniform thermal neutron flux distribution including local regions of relatively high thermal neutron flux to which a portion of said assembly is exposed, the improvement which comprises a second fuel material initially containing $Th^{232}$ and a thermal neutron fissionable material, and having a value of macroscopic thermal neutron absorption cross section $\Sigma_a$ initially no less than that of said first fuel material, said second fuel material being disposed in said assembly in said local region of relatively high thermal neutron flux.

4. A nuclear fuel element adapted for use in assemblies of such elements with a neutron moderator in a heterogeneous structure capable of a self-sustained thermal neutron induced chain nuclear fission reaction and in which assembly structural inhomogeneities in moderator-to-fuel ratio produce a non-uniform thermal neutron flux distribution including local regions of relatively high thermal neutron flux to which a portion of said fuel element is exposed, which fuel element comprises at least one fuel element segment, a body of nuclear fuel contained in said segment, said body comprising a first fuel material and a second fuel material, said first fuel material initially containing $U^{238}$ and a thermal neutron fissionable material, said second fuel material initially containing $Th^{232}$ and a thermal neutron fissionable material, the amounts of $Th^{232}$ and fissionable material in said second fuel material being sufficient to provide a value of macroscopic thermal neutron absorption cross section $\Sigma_a$ for said material initially no less than the value of macroscopic thermal neutron absorption cross section $\Sigma_a$ for said first fuel material, at least the major portion of said second fuel material being disposed in said segment in at least one local region of relatively high thermal neutron flux.

5. A nuclear fuel element according to claim 4 wherein said fuel element segment comprises an elongated tube of circular cross section containing said body of nuclear fuel, sealing means at each end of said tube, said second fuel material being disposed at each end of said segment adjacent said sealing means.

6. A nuclear fuel element according to claim 4 wherein said fuel element segment comprises an elongated laminar plate containing said body of nuclear fuel as an inner layer, said second fuel material being disposed along at least part of the periphery of said inner layer.

7. A nuclear fuel element according to claim 4 which comprises a plurality of said fuel element segments secured to one another and providing a plurality of said bodies of nuclear fuel in fixed spaced apart relation.

8. A nuclear fuel element assembly adapted for use with other assemblies of such elements and with a neutron moderator in a heterogeneous structure capable of a self-sustained thermal neutron induced chain nuclear fission reaction and in which assembly structural inhomogeneities in moderator-to-fuel ratio produce a non-uniform thermal neutron flux distribution including local regions of relatively high thermal neutron flux to which minor portions of said fuel assembly are exposed, which fuel assembly comprises a plurality of elongated nuclear fuel elements spaced apart from one another in fixed spatial relation, at least one nuclear fuel body contained in each of said elements, said nuclear fuel body comprising at least one of a first fuel material and a second fuel material, said first fuel material initially containing $U^{238}$ and a thermal neutron fissionable material, said second fuel material initially containing $Th^{232}$ and a thermal neutron fissionable material, the amounts of $Th^{232}$ and fissionable material in said second fuel material being sufficient to provide a value of macroscopic thermal neutron absorption cross section $\Sigma_a$ for said material initially no less than the value of macroscopic thermal neutron absorption cross section $\Sigma_a$ for said first fuel material, at least the major portion of said second fuel material being disposed in the elements of said assembly in the local regions of relatively high thermal neutron flux, and at least the major portion of said first fuel material being disposed in the fuel elements of said assembly other than in said local regions.

9. A nuclear fuel element assembly according to claim 8 wherein said fuel elements each contain a plurality of longitudinally spaced nuclear fuel bodies, the bodies of said second fuel material being disposed in the local regions of relatively high thermal neutron flux throughout the length of at least some of the peripheral fuel elements of said assembly and at the ends of the nuclear fuel bodies in all other fuel elements in said assembly.

10. A nuclear reactor fuel assembly according to claim 9 wherein said fuel elements are elongated, rod type elements comprising a plurality of axially aligned segments secured to one another, the bodies of said second fuel material being disposed throughout the length of at least one of the peripheral elements of said assembly and at the ends of each rod segment of all other fuel elements in said assembly in the local regions of relatively high thermal neutron flux.

11. A nuclear reactor fuel assembly according to claim 10 in combination with a body of a third fuel material disposed in said local regions of relatively high thermal neutron flux at the ends of said segments in said peripheral fuel elements containing said second fuel material, said third fuel material comprising said second fuel material and a nuclear fission reaction poison to provide a value of macroscopic thermal neutron absorption cross section $\Sigma_a$ which is initially not less than the value of macroscopic thermal neutron absorption cross section $\Sigma_a$ for said second fuel material.

12. A nuclear reactor fuel assembly according to claim 9 wherein said fuel elements are elongated plate type elements comprising a plurality of aligned plate segments secured to one another, the bodies of said second fuel material being disposed throughout the length of at least one of the elements at the periphery of said assembly and at the ends of each plate segment of all other fuel elements in said assembly in the local regions of relatively high thermal neutron flux.

13. A nuclear reactor fuel assembly according to claim 12 wherein bodies of said second fuel material are disposed along the edge of each of said plate segments adjacent the periphery of said assembly in the local region of relatively high thermal neutron flux.

14. A nuclear fuel element assembly adapted for use with other assemblies of such elements and with a neutron moderator in a heterogeneous reactor structure capable of a self-sustained thermal neutron induced chain nuclear fission reaction and in which structural inhomogeneities in the form of moderator slabs produce a non-uniform thermal neutron flux distribution including local regions of relatively high thermal neutron flux in and adjacent said slabs and to which portions of said fuel assembly are exposed, which fuel assembly comprises a plurality of elongated rod type nuclear fuel elements spaced apart from one another in fixed parallel relation and including regular and compensation fuel elements, said regular elements each having at least one regular fuel body initially containing $U^{238}$ and a thermal neutron fissionable material, said compensation elements each having at least one compensation fuel body initially containing $Th^{232}$ and a thermal neutron fissionable material, the compositions of said regular and compensation fuels being such that the macroscopic thermal neutron absorption cross section $\Sigma_a$ for said compensation fuel is initially no less than the cross section $\Sigma_a$ for said regular fuel, the majority of the compensation elements being disposed in the periphery of said assembly in said local regions of relatively high thermal neutron flux adjacent said moderator slab.

15. A nuclear fuel element assembly according to claim 14 wherein said fuel assembly is square and said fuel elements are disposed therein on a square pitch, the majority of said compensation fuel elements being disposed at at least one row intersection and in at least two intersecting outer or peripheral rows of fuel elements of said fuel assembly.

16. A nuclear fuel assembly according to claim 14 wherein said fuel assembly is hexagonal and said fuel elements are disposed therein on a triangular pitch, the majority of said compensation fuel elements being disposed at at least one row intersection and in at least two outer or peripheral rows of fuel elements of said assembly.

17. A nuclear fuel element assembly adapted for use with other assemblies of such elements and with a neutron moderator in a heterogeneous structure capable of a self-sustained thermal neutron induced chain nuclear fission reaction in which assembly structural inhomogeneities in moderator-to-fuel ratio produce a non-uniform thermal neutron flux distribution including local regions of relatively high thermal neutron flux to which portions of said fuel assembly are exposed, which fuel assembly comprises an elongated structural element, a plurality of elongated nuclear fuel elements spaced apart from one another in fixed spatial relation adjacent said structural element, at least one nuclear fuel body contained in each of said elements and in said structural element, each said nuclear fuel body comprising at least one of a first fuel material and a second fuel material, said first fuel material initially containing $U^{238}$ and a thermal neutron fissionable material, said second fuel material initially containing $Th^{232}$ and a thermal neutron fissionable material, the amounts of $Th^{232}$ and fissionable material in said second fuel material being sufficient to provide a value of macroscopic thermal neutron absorption cross section $\Sigma_a$ for said material initially no less than the value of macroscopic thermal neutron absorption cross section $\Sigma_a$ for said first fuel material, at least part of said second fuel material being disposed in said structural element in the local regions of relatively high thermal neutron flux, at least the major portion of said first fuel material being disposed in said fuel elements of said assembly other than in said local regions.

18. A nuclear reactor fuel element assembly according to claim 17 wherein said nuclear fuel elements are elongated rod type elements, and said structural element is an open ended tubular flow channel enclosing said assembly.

19. A nuclear reactor fuel element assembly according to claim 18 wherein another part of said second fuel material is disposed throughout the length of at least one of the peripheral elements of said assembly in the local region of relatively high thermal neutron flux.

20. A nuclear reactor fuel element assembly according to claim 17 wherein said nuclear fuel elements are elongated plate type elements, and said structural element comprises a pair of parallel spaced apart side plates between which said plate type fuel elements are supported.

21. In a device which comprises a first fuel material initially containing a major proportion of $U^{238}$ and a minor proportion of a thermal neutron fissionable material, and which upon irradiation by neutrons of thermal energy spectrum is subject to a non-uniform thermal neutron flux distribution including local regions of relatively high thermal neutron flux to which a portion of said device is exposed, the improvement which comprises a second fuel material disposed in said device in said local region of relatively high thermal neutron flux, said second fuel material initially containing a major proportion of $Th^{232}$ and a minor proportion of a thermal neutron fissionable material, and having a value of macroscopic thermal neutron absorption cross section $\Sigma_a$ initially no less than that of said first fuel material.

22. In a nuclear fuel element which comprises a first fuel material initially containing a major proportion of $U^{238}$ and a minor proportion of a thermal neutron fissionable material, said element being subject upon neutron irradiation to a non-uniform thermal neutron flux distribution including local regions of relatively high thermal neutron flux to which a portion of said element is exposed, the improvement which comprises a second fuel material initially containing a major proportion of $Th^{232}$ and a minor proportion of a thermal neutron fissionable material and having a value of macroscopic thermal neutron absorption cross section $\Sigma_a$ initially no less than that of said first fuel material, said second fuel material being disposed in said element in said local region of relatively high thermal neutron flux.

23. In a nuclear fuel assembly which comprises a plurality of fuel elements having a first fuel material initially containing a major proportion of $U^{238}$ and a minor proportion of a thermal neutron fissionable material, said assembly being subject upon neutron irradiation to a non-uniform thermal neutron flux distribution including local regions of relatively high thermal neutron flux to which a portion of said assembly is exposed, the improvement which comprises a second fuel material initially containing a major proportion of $Th^{232}$ and a minor proportion of a thermal neutron fissionable material and having a value of macroscopic thermal neutron absorption cross section $\Sigma_a$ initially no less than that of said first fuel material, said second fuel material being disposed in said assembly in said local region of relatively high thermal neutron flux.

References Cited in the file of this patent

UNITED STATES PATENTS

| | | |
|---|---|---|
| 2,838,452 | West et al. | June 10, 1958 |
| 2,852,456 | Wade | Sept. 16, 1958 |
| 2,870,076 | Koch | Jan. 20, 1959 |
| 2,954,335 | Wigner | Sept. 27, 1960 |
| 2,982,713 | Sankovich et al. | May 2, 1961 |

FOREIGN PATENTS

| | | |
|---|---|---|
| 792,170 | Great Britain | Mar. 19, 1958 |
| 1,211,585 | France | Oct. 12, 1959 |
| 589,614 | Belgium | Aug. 1, 1960 |
| 1,241,339 | France | Aug. 8, 1960 |
| 1,109,798 | Germany | June 29, 1961 |

OTHER REFERENCES

BNL-325, Neutron Absorption Cross Sections, 1958, pages 312–314, 317–319, 330, 332, 333 and 335.

TID-7559 (Part 1), Fuel Elements Conference, August 1959, pages 135, 228 and 229.